(12) United States Patent
Zhang et al.

(10) Patent No.: US 12,463,736 B2
(45) Date of Patent: Nov. 4, 2025

(54) CROSS-LINK INTERFERENCE REPORTING FOR WIRELESS COMMUNICATIONS

(71) Applicant: QUALCOMM Incorporated, San Diego, CA (US)

(72) Inventors: Qian Zhang, Basking Ridge, NJ (US); Muhammad Sayed Khairy Abdelghaffar, San Jose, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 335 days.

(21) Appl. No.: 18/335,040

(22) Filed: Jun. 14, 2023

(65) Prior Publication Data

US 2024/0421924 A1    Dec. 19, 2024

(51) Int. Cl.
*H04B 17/345*   (2015.01)
*H04W 24/10*   (2009.01)

(52) U.S. Cl.
CPC .......... *H04B 17/345* (2015.01); *H04W 24/10* (2013.01)

(58) Field of Classification Search
CPC .............................. H04B 17/345; H04W 24/10
See application file for complete search history.

(56) References Cited

U.S. PATENT DOCUMENTS

| | | | |
|---|---|---|---|
| 2021/0006438 A1* | 1/2021 | Harrebek | H04W 24/10 |
| 2022/0022073 A1* | 1/2022 | Zhang | H04W 24/08 |
| 2022/0086843 A1* | 3/2022 | Ying | H04W 72/541 |
| 2022/0191724 A1* | 6/2022 | Hwang | H04B 17/336 |
| 2025/0063410 A1* | 2/2025 | Tao | H04W 8/24 |

* cited by examiner

*Primary Examiner* — Jamaal Henson
(74) *Attorney, Agent, or Firm* — Holland & Hart LLP

(57) ABSTRACT

Methods, systems, and devices for wireless communication are described. In some systems, a user equipment (UE) may transmit a message that indicates a first quantity of calculations that the UE is capable of performing within a same time period. The first quantity of calculations may include at least one calculation that is based on one or more cross-link interference (CLI) measurements at the UE. A first quantity of reports supported by the UE may be based on the first quantity of calculations. The CLI measurements may correspond to interference at the UE based on communications by at least a second UE. The UE may transmit a second quantity of one or more reports based on the CLI measurements. The second quantity of reports may be less than or equal to the first quantity of reports based on the message.

30 Claims, 17 Drawing Sheets

CROSS-LINK INTERFERENCE REPORTING FOR WIRELESS COMMUNICATIONS

FIELD OF TECHNOLOGY

The following relates to wireless communication, including cross-link interference reporting for wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

Some network entities may support full duplex communications with one or more UEs. The UEs may, in some cases, experience inter-UE cross-link interference (CLI) due to the full duplex communications. The CLI may correspond to interference experienced by one UE due to transmissions by the other UE.

The described techniques relate to cross-link interference (CLI) reporting for wireless communications, including improved methods, systems, devices, and apparatuses that support CLI reporting. For example, the described techniques provide for a user equipment (UE) to report a quantity of CLI calculations the UE is capable of performing within a given time period. The UE may transmit, to a network entity, a message that indicates a first quantity of calculations that the UE is capable of performing within a same time period (e.g., simultaneously). A first quantity of reports supported by the UE may be based on the first quantity of calculations. For example, the UE may generate a first quantity of reports, such as CLI reports, channel state information (CSI) reports, or some other type of reports, based on the first quantity of calculations. The first quantity of calculations may include at least one calculation that is based on one or CLI measurements at the UE. The UE may perform the CLI measurements using CLI resources. For example, the UE may measure, during one or more CLI resources, interference at the UE due to transmissions by at least one other UE. The UE may transmit a second quantity of one or more reports to the network entity based on the CLI measurements. The second quantity of reports may be less than or equal to the first quantity of reports based on the message.

A method for wireless communication by a UE is described. The method may include transmitting a message that indicates a first quantity of calculations that the UE is capable of performing within a same time period, where the first quantity of calculations includes a least one calculation that is based on one or more CLI measurements at the UE, and where a first quantity of reports supported by the UE is based on the first quantity of calculations, performing the one or more CLI measurements using one or more CLI resources, where the one or more CLI measurements correspond to interference at the UE based on communications by at least a second UE, and transmitting a second quantity of one or more reports based on the one or more CLI measurements, where the second quantity of one or more reports is less than or equal to the first quantity of reports in accordance with the message.

A UE for wireless communication is described. The UE may include one or more processors, one or more memories coupled with the one or more processors, and instructions stored in the one or more memories. The instructions may be executable by the one or more processors to cause the UE to transmit a message that indicates a first quantity of calculations that the UE is capable of performing within a same time period, where the first quantity of calculations includes a least one calculation that is based on one or more CLI measurements at the UE, and where a first quantity of reports supported by the UE is based on the first quantity of calculations, perform the one or more CLI measurements using one or more CLI resources, where the one or more CLI measurements correspond to interference at the UE based on communications by at least a second UE, and transmit a second quantity of one or more reports based on the one or more CLI measurements, where the second quantity of one or more reports is less than or equal to the first quantity of reports in accordance with the message.

Another UE for wireless communication is described. The UE may include means for transmitting a message that indicates a first quantity of calculations that the UE is capable of performing within a same time period, where the first quantity of calculations includes a least one calculation that is based on one or more CLI measurements at the UE, and where a first quantity of reports supported by the UE is based on the first quantity of calculations, means for performing the one or more CLI measurements using one or more CLI resources, where the one or more CLI measurements correspond to interference at the UE based on communications by at least a second UE, and means for transmitting a second quantity of one or more reports based on the one or more CLI measurements, where the second quantity of one or more reports is less than or equal to the first quantity of reports in accordance with the message.

A non-transitory computer-readable medium storing code for wireless communication at a UE is described. The code may include instructions executable by one or more processors to transmit a message that indicates a first quantity of calculations that the UE is capable of performing within a same time period, where the first quantity of calculations includes a least one calculation that is based on one or more CLI measurements at the UE, and where a first quantity of reports supported by the UE is based on the first quantity of calculations, perform the one or more CLI measurements using one or more CLI resources, where the one or more CLI measurements correspond to interference at the UE based on communications by at least a second UE, and transmit a second quantity of one or more reports based on the one or more CLI measurements, where the second quantity of one or more reports is less than or equal to the first quantity of reports in accordance with the message.

In some examples of the method, apparatuses, and non-transitory computer-readable medium described herein, transmitting the message may include operations, features, means, or instructions for transmitting, via the message, a parameter that indicates the first quantity of calculations that the UE may be capable of performing within the same time period, where the first quantity of reports that may be based on the first quantity of calculations includes CSI reports that may be based on the one or more CLI measurements and may be further based one or more other channel quality measurements.

In some examples of the method, apparatuses, and non-transitory computer-readable medium described herein, transmitting the message may include operations, features, means, or instructions for transmitting, via the message, a parameter that indicates the first quantity of calculations that the UE may be capable of performing within the same time period, where the first quantity of reports that may be based on the first quantity of calculations includes one or more CSI reports, one or more CLI reports, or any combination thereof that indicate the one or more CLI measurements.

In some examples of the method, apparatuses, and non-transitory computer-readable medium described herein, transmitting the message may include operations, features, means, or instructions for transmitting, via the message, a parameter that indicates the first quantity of calculations that the UE may be capable of performing within the same time period, where the first quantity of reports that may be based on the first quantity of calculations includes one or more CLI reports that indicate the one or more CLI measurements.

Some examples of the method, apparatuses, and non-transitory computer-readable medium described herein may further include operations, features, means, or instructions for transmitting, via the message or a second message, a second parameter that indicates a second quantity of calculations that the UE may be capable of performing within the same time period or a different time period, the second quantity of calculations based on one or more CSI measurements and associated with one or more CSI reports different than the one or more CLI reports.

Some examples of the method, apparatuses, and non-transitory computer-readable medium described herein may further include operations, features, means, or instructions for receiving control signaling including a request for the UE to report the one or more CLI measurements via one or more CLI reports, where the control signaling includes one more resource indicators associated with the one or more CLI measurements and generating, based on the control signaling, each report of the second quantity of one or more reports using a single processing unit, where the second quantity of one or more reports includes CLI reports.

Some examples of the method, apparatuses, and non-transitory computer-readable medium described herein may further include operations, features, means, or instructions for receiving control signaling including a request for the UE to report the one or more CLI measurements via one or more CLI reports, where the control signaling includes one more resource indicators associated with the one or more CLI measurements and generating, based on the control signaling, each report of the second quantity of one or more reports using a quantity of processing units, where the second quantity of one or more reports includes CLI reports, and where the quantity of processing resources may be based on a quantity of CLI resources.

Some examples of the method, apparatuses, and non-transitory computer-readable medium described herein may further include operations, features, means, or instructions for receiving control signaling including a request for the UE to report the one or more CLI measurements via one or more CSI reports, where the control signaling includes one or more resource indicators associated with CSI measurements and generating, based on the control signaling, each report of the second quantity of one or more reports using a quantity of processing units, where the quantity of processing units may be based on a quantity of CSI resources allocated for channel measurement.

In some examples of the method, apparatuses, and non-transitory computer-readable medium described herein, the quantity of processing resources may be further based on a quantity of one or more CLI resources.

Some examples of the method, apparatuses, and non-transitory computer-readable medium described herein may further include operations, features, means, or instructions for receiving control signaling including a request for the UE to report the one or more CLI measurements and one or more CSI measurements jointly via the second quantity of one or more reports, where the control signaling includes one or more resource indicators associated with the one or more CSI measurements and the one or more CLI measurements and generating, based on the control signaling, each report of the second quantity of one or more reports using a quantity of processing units, where the quantity of processing units may be based on a quantity of CSI resources allocated for channel measurement, where the second quantity of one or more reports includes one or more CSI reports that may be based on the one or more CLI measurements and may be further based one or more other channel quality measurements.

In some examples of the method, apparatuses, and non-transitory computer-readable medium described herein, the quantity of processing units may be further based on a quantity of one or more CLI resources.

Some examples of the method, apparatuses, and non-transitory computer-readable medium described herein may further include operations, features, means, or instructions for transmitting a capability message that indicates a capability of the UE to measure and report the one or more CLI measurements within the same time period as one or more CSI measurements.

In some examples of the method, apparatuses, and non-transitory computer-readable medium described herein, the second quantity of one or more reports includes CSI reports that indicate the one or more CLI measurements based on the capability of the UE.

In some examples of the method, apparatuses, and non-transitory computer-readable medium described herein, the first quantity of reports includes reports associated with a single component carrier or reports associated with a set of multiple component carriers.

In some examples of the method, apparatuses, and non-transitory computer-readable medium described herein, the first quantity of calculations may be equal to the first quantity of reports.

In some examples of the method, apparatuses, and non-transitory computer-readable medium described herein, the one or more CLI resources include CLI resources for reference signal received power, for received signal strength indication measurements, or both.

In some examples of the method, apparatuses, and non-transitory computer-readable medium described herein, the first quantity of calculations may be based on a quantity of processing units at the UE.

A method for wireless communication by a network entity is described. The method may include receiving, from a UE, a message that indicates a first quantity of calculations that the UE is capable of performing within a same time period, where the first quantity of calculations includes at least one calculations that is based on one or more CLI measurements that correspond to interference at the UE based on communications by at least a second UE, and where a first quantity of reports supported by the UE is based on the first quantity of calculations and receiving a second quantity of one or more reports based on the one or more CLI measurements, where the second quantity of one or more reports is less than or equal to the first quantity of reports in accordance with the message.

A network entity for wireless communication is described. The network entity may include one or more processors, one or more memories coupled with one or more processors, and instructions stored in the one or more memories. The instructions may be executable by the one or more processors to cause the network entity to receive, from a UE, a message that indicates a first quantity of calculations that the UE is capable of performing within a same time period, where the first quantity of calculations includes at least one calculations that is based on one or more CLI measurements that correspond to interference at the UE based on communications by at least a second UE, and where a first quantity of reports supported by the UE is based on the first quantity of calculations and receive a second quantity of one or more reports based on the one or more CLI measurements, where the second quantity of one or more reports is less than or equal to the first quantity of reports in accordance with the message.

Another network entity for wireless communication is described. The network entity may include means for receiving, from a UE, a message that indicates a first quantity of calculations that the UE is capable of performing within a same time period, where the first quantity of calculations includes at least one calculation that is based on one or more CLI measurements that correspond to interference at the UE based on communications by at least a second UE, and where a first quantity of reports supported by the UE is based on the first quantity of calculations and means for receiving a second quantity of one or more reports based on the one or more CLI measurements, where the second quantity of one or more reports is less than or equal to the first quantity of reports in accordance with the message.

A non-transitory computer-readable medium storing code for wireless communication at a network entity is described. The code may include instructions executable by one or more processors to receive, from a UE, a message that indicates a first quantity of calculations that the UE is capable of performing within a same time period, where the first quantity of calculations includes at least one calculations that is based on one or more CLI measurements that correspond to interference at the UE based on communications by at least a second UE, and where a first quantity of reports supported by the UE is based on the first quantity of calculations and receive a second quantity of one or more reports based on the one or more CLI measurements, where the second quantity of one or more reports is less than or equal to the first quantity of reports in accordance with the message.

In some examples of the method, apparatuses, and non-transitory computer-readable medium described herein, receiving the message may include operations, features, means, or instructions for receiving, via the message, a parameter that indicates the first quantity of calculations that the UE may be capable of performing within the same time period, where the first quantity of reports that may be based on the first quantity of calculations includes CSI reports that may be based on the one or more CLI measurements and may be further based one or more other channel quality measurements.

In some examples of the method, apparatuses, and non-transitory computer-readable medium described herein, receiving the message may include operations, features, means, or instructions for receiving, via the message, a parameter that indicates the first quantity of calculations that the UE may be capable of performing within the same time period, where the first quantity of reports that may be based on the first quantity of calculations includes one or more CSI reports, one or more CLI reports, or any combination thereof that indicate the one or more CLI measurements.

In some examples of the method, apparatuses, and non-transitory computer-readable medium described herein, receiving the message may include operations, features, means, or instructions for receiving, via the message, a parameter that indicates the first quantity of calculations that the UE may be capable of performing within the same time period, where the first quantity of reports that may be based on the first quantity of calculations includes one or more CLI reports that indicate the one or more CLI measurements.

Some examples of the method, apparatuses, and non-transitory computer-readable medium described herein may further include operations, features, means, or instructions for receiving, via the message or a second message, a second parameter that indicates a second quantity of calculations that the UE may be capable of performing within the same time period or a different time period, the second quantity of calculations based on one or more CSI measurements and associated with one or more CSI reports different than the one or more CLI reports.

Some examples of the method, apparatuses, and non-transitory computer-readable medium described herein may further include operations, features, means, or instructions for transmitting control signaling including a request for the UE to report the one or more CLI measurements via one or more CLI reports, where the control signaling includes one more resource indicators associated with the one or more CLI measurements, and where the second quantity of one or more reports includes CLI reports.

Some examples of the method, apparatuses, and non-transitory computer-readable medium described herein may further include operations, features, means, or instructions for transmitting control signaling including a request for the UE to report the one or more CLI measurements via one or more CSI reports, where the control signaling includes one more resource indicators associated with CSI measurements, and where the second quantity of one or more reports includes CSI reports.

Some examples of the method, apparatuses, and non-transitory computer-readable medium described herein may further include operations, features, means, or instructions for transmitting control signaling including a request for the UE to report the one or more CLI measurements and one or more CSI measurements jointly via the second quantity of one or more reports, where the control signaling includes one more resource indicators associated with the one or more CSI measurements and the one or more CLI measurements, and where the second quantity of one or more reports includes one or more CSI reports that may be based on the one or more CLI measurements and may be further based on one or more other channel quality measurements.

Some examples of the method, apparatuses, and non-transitory computer-readable medium described herein may further include operations, features, means, or instructions for receiving a capability message that indicates a capability of the UE to measure and report the one or more CLI measurements within the same time period as one or more CSI measurements.

In some examples of the method, apparatuses, and non-transitory computer-readable medium described herein, the second quantity of one or more reports includes CSI reports that indicate the one or more CLI measurements based on the capability of the UE.

In some examples of the method, apparatuses, and non-transitory computer-readable medium described herein, the first quantity of reports includes reports associated with a single component carrier or reports associated with a set of multiple component carriers.

In some examples of the method, apparatuses, and non-transitory computer-readable medium described herein, the first quantity of calculations may be equal to the first quantity of reports.

DETAILED DESCRIPTION

Figure 1:
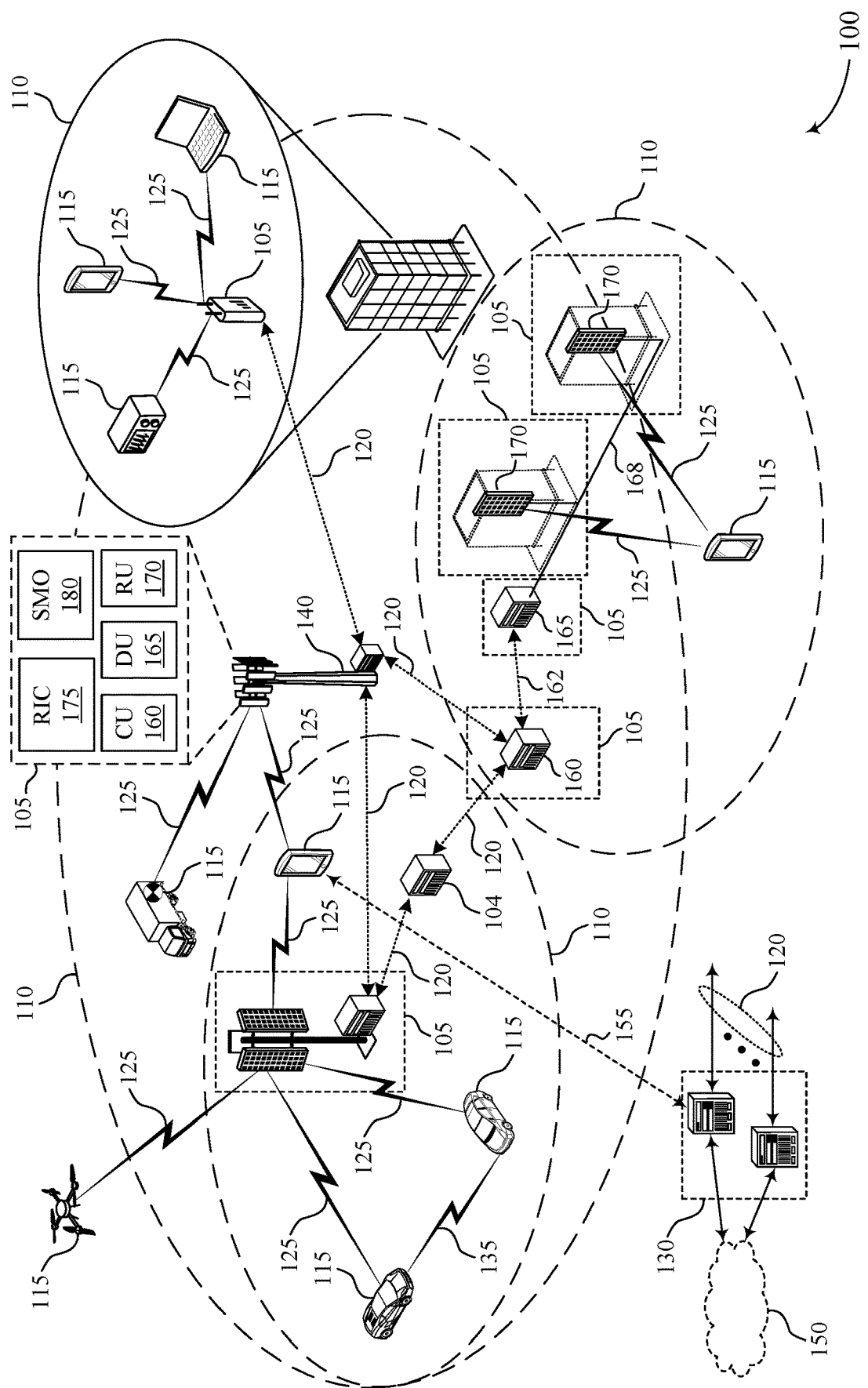
FIG. 1 shows an example of a wireless communications system that supports cross-link interference (CLI) reporting for wireless communications.

In some wireless communications systems, multiple devices transmitting and receiving at the same time or within overlapping time resources may experience cross-link interference (CLI). For example, data transmitted by a user equipment (UE) in a first cell may cause CLI at another UE that is receiving data in a neighboring cell (e.g., inter-cell CLI). In some examples, if a network entity supports full duplex communications with two or more UEs in a same cell, the communications at each of the UEs may cause CLI (e.g., intra-cell CLI). In some examples, the CLI may represent interference between downlink communications in a first sub-band and uplink communications in a second sub-band (e.g., inter-sub-band CLI) during full duplex communications. To reduce the effects of CLI, a UE may report CLI to a network entity.

Techniques, systems, and devices described herein provide for a UE to transmit a message to indicate a quantity of calculations the UE can perform within a given time period (e.g., simultaneously or at least partially concurrently). The quantity of calculations may correspond to or be the same as a corresponding quantity of reports the UE can generate within the same time period. In some examples, the UE may calculate channel state information (CSI) metrics based on one or more CSI measurements and also based on one or more CLI measurements obtained by the UE. The UE may report the CLI implicitly via the CSI report because the CSI metrics may be calculated based in part on the CLI measurements. In such a reporting scenario, the message transmitted by the UE may indicate a quantity of simultaneous calculations for generating CSI reports based on CLI measurements that the UE is capable of performing within a given time period. In some other examples, the UE may calculate CLI and CSI metrics separately within a same time period. In such reporting scenarios, the UE may indicate a quantity of total calculations and corresponding reports including CSI and CLI that the UE is capable of processing in a given time period. In some other examples, the UE may calculate and report CLI metrics separately from CSI metrics. In such reporting scenarios, the UE may transmit a message that indicates a quantity of CLI calculations and corresponding reports the UE is capable of generating within a given time period. The UE may thereby indicate a supported quantity of CLI reports, CSI reports, or both based on a type of CLI reporting supported by the UE, which may improve resource utilization and coordination between devices, among other features. The supported quantity of calculations and corresponding reports may be associated with a single component carrier or across multiple component carriers.

The UE may process (e.g., generate, perform calculations in support of) the reports based on a quantity of processing units included in or available for use at the UE (e.g., CSI processing units, CSI processing units that additionally support CLI processing (e.g., CSI/CLI processing units), CLI processing units (e.g., separate from CSI processing units), or some other type of unit or resource). The quantity may be based on the type of CLI reporting. If the type of CLI reporting supports CSI and CLI at the same time, the quantity of processing units may be based on a quantity of resources for CSI and a second quantity of CLI resources. If the type of CLI reporting supports CLI reporting separately from CSI reporting, the quantity of processing units may be one processing unit or multiple processing units based on a quantity of CLI resources. The quantity of processing units may be configured by a network entity via control signaling. In some examples, the UE may indicate a capability of the UE to calculate and report CSI and CLI within a same time period, and the network entity may schedule measurement resources for CLI and CSI, uplink resources for CLI and CSI reports, or both, based on the UE capability. The UE and the network entity may thereby coordinate regarding CLI calculations, which may provide for the UE to report CLI more reliably and efficiently while maintaining efficient resource utilization and coordination between devices.

Aspects of the disclosure are initially described in the context of wireless communications systems. Additional aspects of the disclosure are described with reference to CLI reporting schemes and a process flow. Aspects of the disclosure are further illustrated by and described with reference to apparatus diagrams, system diagrams, and flowcharts that relate to CLI reporting for wireless communications.

FIG. 1 shows an example of a wireless communications system 100 that supports CLI reporting for wireless communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support CLI reporting for wireless communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of TS=1/ ($\Delta f_{max} \cdot N_f$) seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some examples, devices in the wireless communications system 100 may support full duplex communications. For example, a network entity 105 may support full duplex communications with two or more UEs 115 that support half duplex operations. The full duplex and half duplex operations may be performed via any frequency ranges (e.g., no restriction on frequency ranges). Examples of such full duplex communications may include sub-band non-overlapping full duplex, in which uplink and downlink transmissions may be performed in different non-overlapping sub-bands. Additionally, or alternatively, devices in the wireless communications may support dynamic or flexible time division duplexing (TDD), in which uplink and downlink transmissions may be performed in different time intervals.

In some cases, full duplex communications may produce CLI. The CLI may include inter-gNB CLI (e.g., between network entities 105), inter-UE CLI (e.g., between UEs 115), intra-subband CLI (e.g., within sub-bands), inter-subband CLI (e.g., between non-overlapping full duplex sub-bands), or any combination thereof, as described in further detail elsewhere herein, including with reference to FIG. 2. Different techniques for managing or reducing CLI, including inter-UE CLI, may be considered. For example, a UE 115 may report UE-to-UE CLI. The UE 115 may transmit a report to a network entity 105 to indicate interference that is measured at the UE 115 based on (e.g., due to or caused by) transmission or reception by at least one other UE 115. The reporting may be periodic, semi-persistent, aperiodic, or event-triggered reporting, among other examples. The UE 115 may transmit the report(s) via layer 1 signaling, layer 2 signaling, or both. The UE 115 may measure the UE-to-UE CLI via periodic, semi-persistent, or aperiodic measurement resources. Techniques for a UE 115 to indicate a quantity of CLI measurements and corresponding reports the UE 115 is capable of processing within a given time period (e.g., simultaneously or at a same time) may be beneficial.

Techniques, systems, and devices described herein provide for a UE 115 to transmit a message to a network entity 105 to indicate a quantity of calculations the UE 115 is capable of performing in a given time period when the UE 115 reports CLI. The indicated quantity of calculations may include calculations based on at least one CLI measurement and may be associated with a quantity of reports that the UE 115 is capable of generating. The quantity of reports may include CLI reports, CSI reports that are based on or include CLI, CSI reports, one or more other types of reports, or any combination thereof. In some examples, the UE 115 may calculate CSI metrics based on one or more channel quality or other CSI measurements and also based on CLI measurements obtained by the UE 115. The UE 115 may report the CLI implicitly via the CSI report based on the CSI metrics being calculated based on the CLI measurements. In such a reporting scenario, the UE 115 may transmit a message to a network entity 105 to indicate a quantity of calculations and corresponding CSI reports that are based on CLI the UE 115 is capable of generating or processing within a given time period. In some other examples, the UE 115 may calculate CLI and CSI separately within a same time period. In such reporting scenarios, the UE 115 may indicate a quantity of total calculations and corresponding reports including CSI and CLI that the UE 115 is capable of processing in a given time period. In some other examples, the UE 115 may calculate and report CLI separately from CSI. In such reporting scenarios, the UE 115 may transmit a message that indicates a quantity of calculations and corresponding CLI reports the UE 115 is capable of generating within a given time period. The UE 115 may thereby indicate a supported quantity of calculations and corresponding CLI reports, CSI reports, or both based on a type of CLI reporting supported by the UE 115, which may improve resource utilization and coordination between devices, among other features. The supported quantity of calculations may be associated with a single component carrier or across multiple component carriers.

The UE 115 may process (e.g., generate) the reports within a quantity of processing units, which may be CSI processing units, CLI processing units, CSI processing units that support both CSI and CLI (e.g., CSI/CLI processing units), some other type of processing unit, or any combination thereof. A processing unit may correspond to a set of one or more resources or one or more processors or other components that calculates CSI, CLI, or any combination thereof. The quantity of processing units may be based on the type of CLI reporting. If the type of CLI reporting supports CSI and CLI at the same time, the quantity of processing units may be based on a quantity of resources for CSI and a second quantity of CLI resources. If the type of CLI reporting supports CLI reporting separately from CSI reporting, the quantity of processing units may be one or more. The quantity of processing units may be configured by a network entity 105 via control signaling. In some examples, the UE 115 may indicate a capability of the UE 115 to calculate and report CSI and CLI within a same time period, and the network entity 105 may schedule measurement resources for CLI and CSI, uplink resources for CLI and CSI reports, or both, based on the UE 115 capability. The UE 115 and the network entity 105 may thereby coordinate regarding CLI calculations, which may provide for the UE 115 to report CLI more reliably and efficiently while maintaining efficient resource utilization and coordination between devices.

Figure 2:
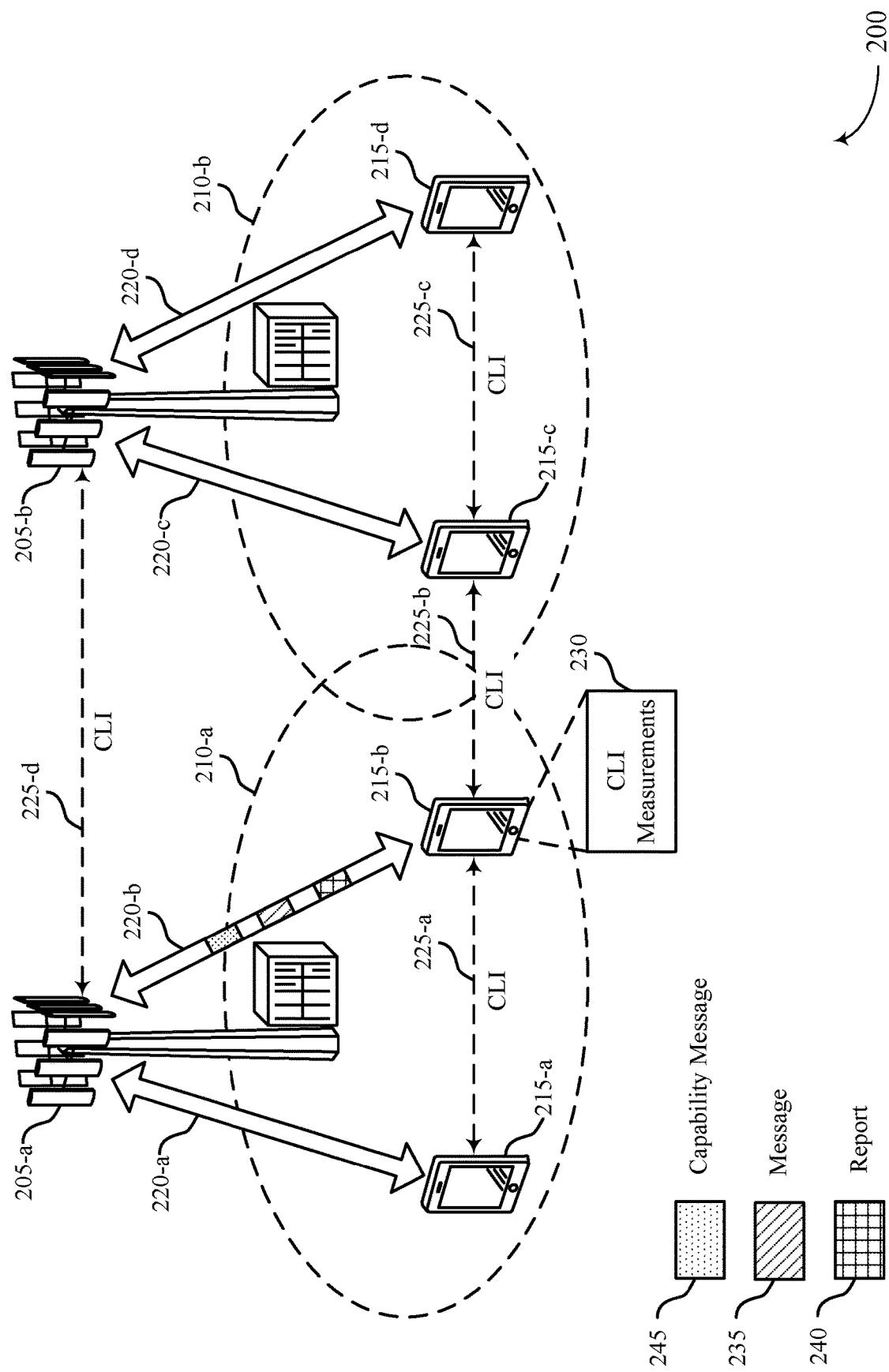
FIG. 2 shows an example of a wireless communications system that supports CLI reporting for wireless communications in accordance with one or more aspects of the present disclosure.

FIG. 2 shows an example of a wireless communications system 200 that supports CLI reporting for wireless communications in accordance with one or more aspects of the present disclosure. The wireless communications system 200 may include network entities 205-a and 205-b, as well as UEs 215-a, 215-b, 215-c, and 215-d, which may represent examples of a network entity 105 and a UE 115 as described with reference to FIG. 1. The network entity 205-a may communicate with the UEs 215-a and 215-b within the geographic coverage area 210-a and via communication links 220-a and 220-b, respectively. The network entity 205-b may communicate with the UEs 215-c and 215-d within the geographic coverage area 210-b and via the communication links 220-c and 220-d, respectively. In some examples, one or more of the UEs 215 may obtain and report one or more CLI measurements 230, which may correspond to measurements of interference experienced by the UE 215 based on transmission and reception by one or more other UEs 215.

The network entities 205-*a* and 205-*b* may support full duplex communications (e.g., downlink/uplink MU-MIMO). For example, the network entity 205-*a* may transmit downlink communications to the UE 215-*b* at the same time that the network entity 205-*a* receives uplink communications from the UE 215-*a*, or vice versa. The UEs 215 may support full duplex or half duplex operations. The network entity 205-*b* may similarly transmit downlink communications to the UE 215-*d* at the same time that the network entity 205-*b* receives uplink communications from the UE 215-*c*, or vice versa. In some examples, the downlink transmissions by the network entity 205-*a* may interfere with the uplink reception by the network entity 205-*a*, which may be referred to as self-interference or clutter.

In some examples, the full duplex communications may be sub-band full duplex (SBFD) (e.g., simultaneous transmission and reception of downlink and uplink on a sub-band basis). In SBFD, a network entity 205 may transmit a downlink communication and receive an uplink communication at the same time, but on different frequency resources. For example, the different frequency resources may be sub-bands of a frequency band or system bandwidth. SBFD communications may provide for enhanced system capacity, resource utilization, and spectrum efficiency, among other possibilities. In some examples, SBFD communications may support or enable flexible and dynamic uplink and downlink resource adaptation according to uplink and downlink traffic in a robust manner. Additionally, or alternatively, SBFD communications may increase an uplink duty cycle as compared with other types of communications (e.g., half duplex communications), which may improve uplink coverage and reduce latency. For example, a UE 215 may transmit an uplink signal in one or more downlink slots or flexible slots by transmitting the uplink signal via an uplink sub-band allocated for SBFD, or the UE 215 may receive a downlink signal via one or more uplink slots by receiving the downlink signal via the downlink sub-band in the slots, which may reduce latency.

In some examples, the network entity 205 may perform downlink transmissions within a first set of one or more frequency sub-bands of a carrier bandwidth in a slot and may receive uplink communications within a second set of one or more frequency sub-bands of the carrier bandwidth in the slot. The first set of one or more frequency sub-bands for the downlink communications may be contiguous in the carrier bandwidth or may include a first subset of one or more frequency bands on either side of the second set of one or more frequency bands in the frequency domain.

Full duplex communications, including SBFD, may cause some interference. For example, the network entities 205 may experience self-interference between transmissions and receptions. Additionally, or alternatively, the network entities 205, the UEs 215, or both may experience CLI, which may be interference experienced at a device due to communications by one or more other devices. The CLI may include inter-sub-band CLI, inter-cell CLI, intra-cell CLI, inter-UE CLI, inter-gNB CLI, or any combination thereof. CLI may generally correspond to interference observed (e.g., experienced, measured) at one device due to transmission by one or more other neighboring devices. For example, uplink transmissions from the UE 215-*a* to the network entity 205-*a* may interfere with downlink reception at the UE 215-*b* from the network entity 205-*a*. The UE 215-*d* may similarly experience CLI 225-*c* due to transmissions by the UE 215-*c*. Such CLI 225-*a* and 225-*c* may be inter-UE, intra-cell (e.g., caused by communications in the same cell or with the same network entity 205-*a*), and inter-sub-band CLI. The uplink and downlink communications may occur at the same time and within different adjacent sub-bands within a carrier bandwidth. As such, the transmissions on one or more uplink sub-bands may interfere with the one or more adjacent sub-bands allocated for downlink communications.

Other types of CLI may include inter-cell CLI, such as the CLI 225-*b*, or inter-gNB CLI, such as the CLI 225-*d*. For example, the UE 215-*b* may experience the CLI 225-*b* based on transmissions by the UE 215-*c*, which may be in a different cell than the UE 215-*b*. The CLI 225-*b* may similarly be caused by uplink and downlink communications in adjacent sub-bands interfering with one another. The network entity 205-*b* may experience inter-gNB CLI 225-*d* based on transmissions by the network entity 205-*a*, or vice versa. Such CLI 225-*d* may be inter-sub-band. For example, the network entity 205-*a* may transmit downlink transmissions via one or more downlink sub-bands that may be adjacent to one or more uplink sub-bands via which the network entity 205-*b* receives uplink communications, or vice versa. The transmissions may cause interference with the adjacent sub-bands.

In some examples, the network entities 205 may perform partially or fully-overlapped full duplex. In such cases, the network entities 205 may transmit downlink communications via a portion of frequency resources or all frequency resources of a carrier bandwidth and may receive uplink communications via a portion or all frequency resources of the carrier bandwidth at the same time. The frequency resources may at least partially overlap or may completely overlap in the frequency domain. The network entity 205 may separate the transmissions using spatial division multiplexing, or some other techniques. In such cases, the CLI may be referred to as in-band CLI.

Techniques for reducing or mitigating CLI 225 may be beneficial to improve full duplex communications. In some systems, a UE 215 may report UE-to-UE CLI, such as the CLI 225-*a*, 225-*b*, and 225-*c*. The reporting may occur periodically, semi-statically, or aperiodically. In some examples, the reporting may be triggered by an event or other device, such as a network entity 205. To report CLI, the UE 215 may first obtain one or more CLI measurements 230. The UE 215 may measure CLI in a CLI measurement resource, which may be a periodic, semi-persistent, or aperiodic measurement resource allocated for CLI measurements 230. A quantity of CLI measurement resources that the UE 215 uses to measure CLI may vary based on one or more factors, including a quantity of links via which CLI is experienced, a type of CLI reporting scheme, or one or more other parameters. The CLI measurement resources may be, for example, sounding reference signal (SRS) resources, or some other type of resources, allocated for CLI reference signal received power (RSRP) measurements, CLI reference signal received indicator (RSSI) measurements, or some other type of CLI measurements.

In the example of FIG. 2, the UE 215-*b* may obtain the CLI measurements 230 associated with the CLI 225-*a* from the UE 215-*a*, the CLI 225-*b* from the UE 215-*c*, or both. The CLI measurements 230 may thereby correspond to (e.g., estimate, indicate, or represent) an amount of interference observed at the UE 215-*b* due to transmissions by other UEs 215. Although not illustrated in FIG. 2, it is to be understood that the UE 215-*b* may experience CLI 225 from any other UE 215. For example, the UE 215-*b* may experience CLI 225 from the UE 215-*d*, in some examples. The CLI 225 between the UE 215-*b* and 215-*d* may be less powerful than the CLI 225-*a* or 225-*b* based on the relative distances between the UEs 215.

A UE 215 may similarly measure and report other metrics in addition to CLI 225. For example, a UE 215 may measure one or more CSI measurements, such as a channel quality indicator (CQI), a precoding matrix indicator (PMI), a rank indicator (RI), a signal-to-interference-noise ratio (SINR), one or more other metrics, or any combination thereof. In some examples, the UE 215 may indicate a quantity of CSI calculations that the UE 215 may perform at a same time or within a same time period. The quantity of CSI calculations may be associated with or may indicate a corresponding quantity of CSI reports that the UE 215 may process (e.g., measure and generate) at a same time. For example, the UE 215 may indicate a quantity of supported simultaneous CSI calculations (e.g., Ncpu, which may correspond to a quantity of CSI processing units available for concurrent use by the UE 215) and corresponding CSI reports that the UE 215 may support in a component carrier or across all component carriers via one or more parameters (e.g., via a simultaneousCSI-ReportsPerCC parameter or a simultaneousCSI-ReportsAllCC parameter). Techniques for indicating a quantity of CLI calculations and corresponding reports 240 that a UE 215 can support within a same time period are described herein.

Techniques, systems, and devices described herein provide for a UE 215 to indicate a quantity of calculations the UE 215 is capable of performing within a time period (e.g., simultaneously) when at least one of the calculations is based on CLI 225. That is, the UE 215 may indicate, to a network entity 205, that the UE 215 can process up to some quantity of calculations for generating one or more corresponding reports 240 based on at least one CLI measurement 330 within a given time period. The UE 215 may transmit a message 235 that indicates the quantity of calculations the UE 215 is able to support. Although illustrated on the communication link 220-*b* in FIG. 2, it is to be understood that a respective message 235 may be transmitted by any of the UEs 215.

The quantity of calculations that is indicated via the message 235 may be based on a CLI reporting scheme supported by the UE 215. The CLI reporting scheme may be associated with whether the UE 215 reports CLI separately or jointly with other metrics, such as CSI metrics, and a type of report 240 via which the UE 215 indicates the CLI measurements 230. Example CLI reporting schemes are described in further detail elsewhere herein, including with reference to FIG. 3.

The UE 215 may transmit the one or more reports 240 based on the message 235 and the CLI reporting scheme. For example, the UE 215 may transmit one or more CSI reports that are generated based on the CLI measurements 230, or the UE 215 may transmit one or more CSI reports and/or CLI reports that indicate the CLI measurements 230, or the UE 215 may transmit one or more CLI reports that indicate the CLI measurements 230. In this example, a CLI report may represent an example of a report that is different than a CSI report and that indicates or conveys one or more CLI measurements 230. A quantity of calculations performed by the UE 215 and a corresponding quantity of the one or more reports 240 transmitted by the UE 215 may be less than or equal to the quantity or quantities indicated via the message 235. That is, the UE 215 may calculation, generate, and transmit no more reports 240 than the UE 215 is capable of processing within a given time period. The reports 240 may indicate the CLI measurements 230 and, in some examples, one or more other metrics, such as CSI metrics.

The network entity 205 may utilize the CLI measurements 230, along with the one or more other metrics, to schedule subsequent communications in a manner that may reduce or mitigate the CLI 225 observed at the UE 215. For example, if the network entity 205-*a* receives an indication of CLI measurements 230 from the UE 215-*a*, the UE 215-*b*, and one or more other UEs 215, the network entity 205-*a* may schedule communications in a way that optimizes CLI reduction across all devices in the geographic coverage area 210-*a*.

In some examples, a UE 215 may transmit a capability message 245 that indicates whether or not the UE 215 is capable of measuring and reporting CSI and CLI at the same time. For example, if CLI is captured in a CSI reporting framework and if the UE 215 is aperiodically indicated (e.g., via DCI or some other control signaling) to report CLI, the UE 215 may transmit the capability message 245 (e.g., capability signaling) that indicates whether or not the UE 215 can measure and report CSI and CLI simultaneously. If the UE capability supports simultaneous aperiodic reporting of CSI and CLI, the UE 215 may add CLI to the CSI and multiplex the encoded bits over an uplink channel, such as a physical uplink shared channel (PUSCH). For example, based on receiving a capability message 245 indicating that the UE 215-*b* supports CLI and CSI calculations at a same time, the network entity 205-*a* may subsequently transmit DCI or some other control signaling that includes a request or trigger for the UE 215-*b* to report CLI (e.g., the UE 215 is aperiodically indicated to report CLI) at the same time as or within a threshold time period of reporting CSI. The UE 215-*b* may add the CLI measurements 230 to a CSI report and transmit the CSI report with the CLI accordingly. In some examples, if the UE 215-*b* indicates that the UE 215-*b* does not support CLI and CSI computation simultaneously, the network entity 205-*a* may refrain from aperiodically triggering CLI, or may trigger CLI reporting at a time that is offset from a CSI reporting timeline.

The UEs 215 described herein may thereby report CLI measurements 230 to assist the network entity 205 in reducing interference between UEs 215 due to full duplex or other types of communications. The UEs 215 may follow one or more protocols or rules to indicate a quantity of calculations and corresponding reports 240 the UE 215 is capable of generating within a same time period based on CLI measurements 230 and based on a type of CLI reporting scheme to improve efficiency, accuracy, and reliability of the CLI reporting.

Figure 3A:
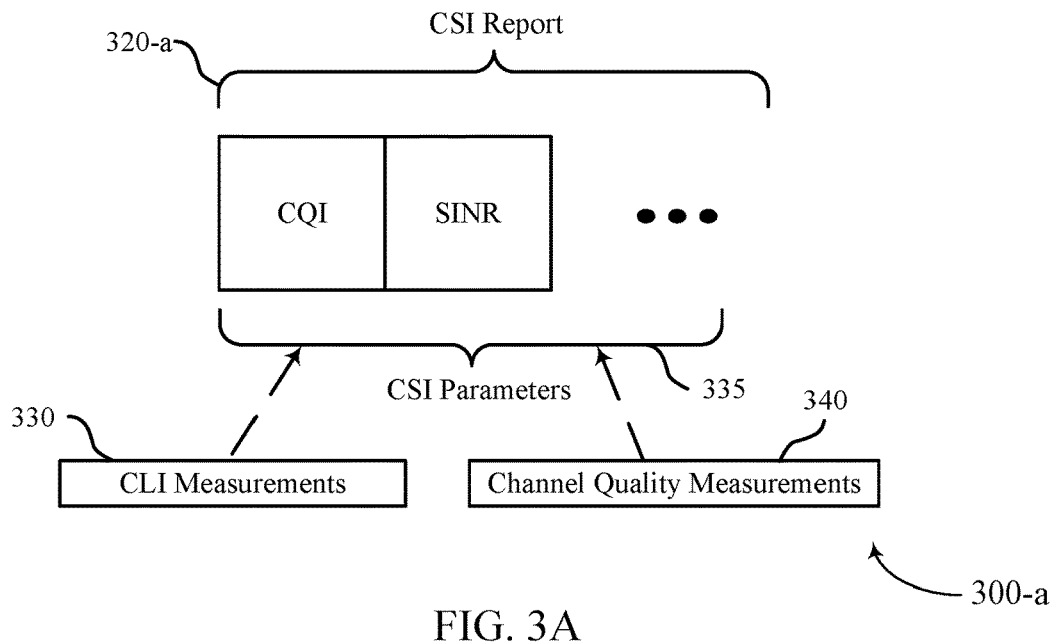
FIGS. 3A-3C show examples of CLI reporting schemes that support CLI reporting for wireless communications in accordance with one or more aspects of the present disclosure.
Figure 3B:
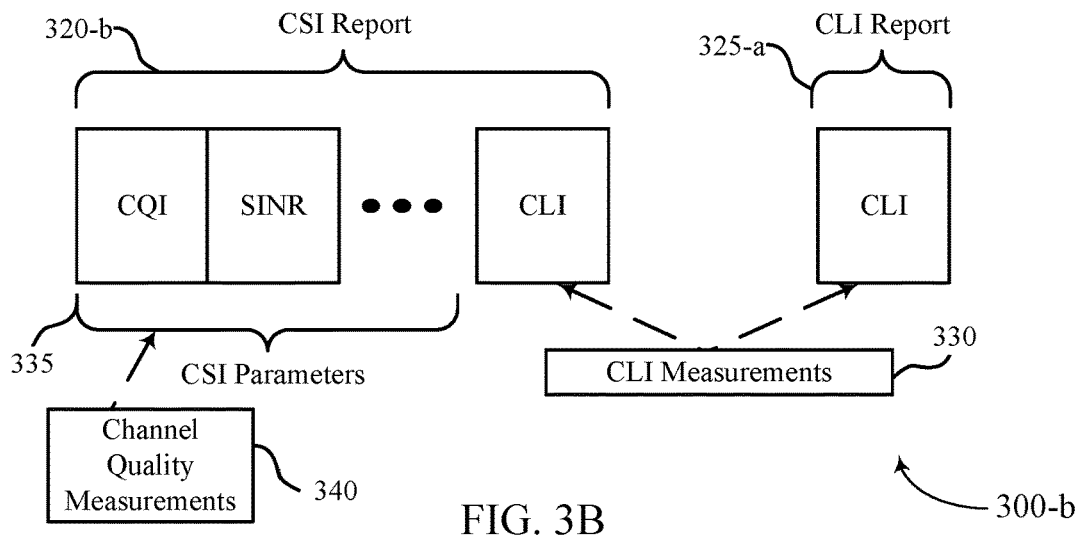
Figure 3C:
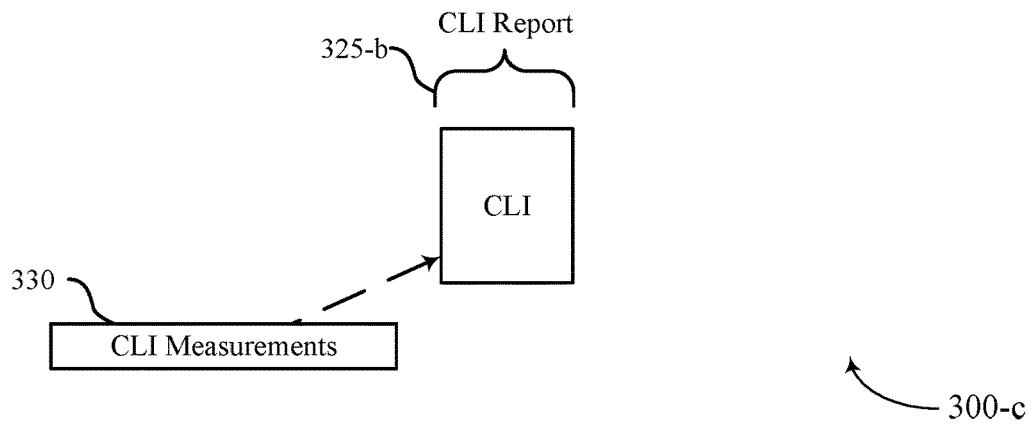

FIGS. 3A-3C show examples of CLI reporting schemes 300 that support CLI reporting for wireless communications in accordance with one or more aspects of the present disclosure. The CLI reporting schemes 300-*a*, 300-*b*, and 300-*c* may represent example configurations of one or more types of reports to support reporting CLI to a network entity. A UE may obtain CLI measurements 330 by measuring one or more CLI resources and may indicate the CLI to the network entity via a CSI report 320, via a CLI report 325, or both, as described herein. Techniques described herein provide for the UE to account for CLI calculations in addition to or as an alternative to CSI calculations when the UE reports a quantity of simultaneous calculations that the UE is capable of supporting.

FIG. 3A illustrates a first example of a CLI reporting scheme 300-*a*. The first example CLI reporting scheme 300-*a* may include the UE implicitly reporting CLI via a CSI report 320-*a*. For example, the UE may obtain CLI measurements 330 based on measurements of one or more CLI resources, as described with reference to FIG. 2, and the UE may utilize the CLI measurements 330 to calculate one or more CSI parameters 335. The CSI report 320-*a* may convey the CSI parameters 335, and may thereby implicitly convey or indicate the CLI measurements 330.

The CSI parameters 335 may include, for example, CQI, SINR, PMI, RI, one or more other metrics or parameters, or any combination thereof. The UE may perform measurements to calculate (e.g., determine, estimate, or measure) the CSI parameters 335. CQI, for example, may be based on measurements of multiple different types of interference and other channel quality measurements 340. As described herein, in the first example CLI reporting scheme 300-*a*, the UE may perform the CQI, SINR, and other CSI metric calculation(s) based on one or more CLI measurements 330 in addition to the other channel quality measurements 340 (e.g., CSI measurements).

The UE may generate the CSI report 320-*a* based on one or more parameters indicated via higher layer signaling, such as RRC signaling or some other type of signaling. The UE may receive, from a network entity, control signaling that conveys a CSI report configuration. The CSI report configuration may include a request for the UE to report CSI based on CLI measurements. In some examples, the CSI report configuration may include a report quantity parameter (e.g., reportQuantity) that may indicate various types or quantities of CSI parameters 335 the UE is to report via the CSI report 320-*a* (e.g., via one or more CSI resource indicators). In the example of the CLI reporting scheme 300-*a*, the CSI report quantity may be set to CQI and SINR, among one or more other CSI parameters 335. In this example, the network entity may request the UE to implicitly incorporate CLI in a CSI report 320-*a* using the report quantity parameter (e.g., also used for requesting the UE to report certain CSI parameters).

If the UE incorporates CLI implicitly via a CSI report 320-*a* (e.g., based on the report quantity parameter), as illustrated in FIG. 3A, the UE may indicate a quantity of CSI calculations based on CLI measurements 330 that the UE is capable of performing within a given time period (e.g., a quantity of supported simultaneous CSI including CLI). The UE may transmit a message to the network entity that indicates the quantity (e.g., a quantity, Ncpu, which in such examples may correspond to a quantity of CSI processing units available for concurrent use by the UE 215 but with the reported CSI metrics additionally based on one or more CLI measurements, in addition to being based on one or more other CSI measurements) of supported CSI report calculations based in part on CLI measurements 330. The UE may indicate the quantity, Ncpu, per component carrier (e.g., via a parameter, such as simultaneousCSI-ReportsPerCC, or some other parameter), or across all component carriers (e.g., via a parameter, such as simultaneousCSI-ReportsAllCC, or some other parameter), or both. If the UE supports Ncpu CSI calculations based on CLI measurements 330, the UE may have Ncpu CSI processing units for processing CSI reports based on CLI. The Ncpu parameter for indicating the quantity of supported calculations may, in some systems, be additionally or alternatively used to indicate a quantity of supported CSI calculations without CLI. That is, the UE may reuse the Ncpu parameter for CLI and CSI.

As described herein, the UE may process the CSI report 320-*a* in one or more CSI processing units (e.g., CPUs) for a quantity of symbols based on a set of rules or protocols. In the example of the CLI reporting scheme 300-*a*, CLI may be implicitly absorbed into the CSI framework by associating one or more CLI resources as additional interference measurement resources for the CSI report 320-*a*. For example, the UE may consider interference from both the CLI resource and other interference measurement resources for CSI and may capture the interference into CSI parameters 335 as part of the CSI calculations. In this example, the UE may process the CSI report 320-*a* within multiple processing units (e.g., $O_{CPU}$). As described herein, for a CSI report 320-*a* that is generated based on a CSI report configuration with a report quantity parameter that indicates multiple CSI resource indicators (e.g., reportQuantity set to 'cri-RI-PMI-CQI', 'cri-RI-i1', 'cri-RI-i1-CQI', 'cri-RI-CQI', or 'cri-RI-LI-PMI-CQI'), the quantity of processing units for a quantity of symbols within which the UE can process the CSI report 320-*a* may be based on at least a first quantity of resources for CSI measurement.

If the UE reports the CLI implicitly via the CSI report, the quantity of processing units may include a first quantity of resources (Ks) for CSI measurement (e.g., NZP-CSI channel measurement resources (CMR)) and a second quantity of one or more resources for CLI measurement. In some examples, the second quantity may be one (e.g., $O_{CPU}$=Ks+1). That is, the UE may be configured to measure CLI in a single CSI processing unit. Additionally, or alternatively, the second quantity may be one or more based on a CLI resource parameter, Ns (e.g., $O_{CPU}$=Ks+Ns). The first quantity of CMRs, the second quantity of CLI resources, or both, may be configured by a network entity. The network entity may configure the first and/or second quantities dynamically or semi-statically based on one or more system parameters.

As described herein, when the UE is configured via a CSI report configuration to indicate or report CQI, RI, PMI, SINR, one or more other CSI parameters 335, or any combination thereof, the UE may process the CSI report with implicit CLI. The processing may occupy a quantity of processing units for a quantity of symbols based on a network entity configuration. The UE may thereby calculate CSI parameters 335 based on CLI measurements 330 and implicitly report CLI via the CSI report 320-*a*.

FIG. 3B illustrates a second example of a CLI reporting scheme 300-*b*. The second example CLI reporting scheme 300-*b* may include the UE performing CLI and CSI reporting at the same time. For example, the UE may obtain the CLI measurements 330 and one or more CSI measurements at the same time and may report the CSI and CLI via a CSI report 320-*b*, a CLI report 325-*a*, or both. Additionally, or alternatively, in some examples, the UE may report CLI jointly as a combination of CSI and CLI. For example, the UE may indicate the CLI with the CSI parameters 335 in the CSI report 320-*b*.

The CSI parameters 335 may include, for example, CQI, SINR, PMI, RI, one or more other metrics or parameters, or any combination thereof. The UE may perform measurements to calculate (e.g., determine, estimate, or measure) the CSI parameters 335. CQI, for example, may be based on measurements of multiple different types of interference and other channel quality measurements 340 within one or more channel measurement resources or interference measurement resources.

As described herein, the UE may perform CSI and CLI calculations at the same time or within a same time period (e.g., simultaneously). The UE may report CLI via a CSI report 320-*b*, a CLI report 325-*a*, some other type or report, or any combination thereof (e.g., the CLI may be explicitly captured in a CLI or CSI report using independent report configurations with simultaneous CSI and CLI calculations).

The CLI report 325-a may represent an example of any type of report different than a CSI report 320 that is configured to convey CLI.

The UE may generate the CSI report 320-b, the CLI report 325-a, or both based on one or more parameters indicated via higher layer signaling, such as RRC signaling or some other type of signaling. For example, the UE may receive, from a network entity, control signaling that indicates a CSI report configuration and/or a CLI report configuration, with an independent report quantity parameter for each of CSI and CLI. A first report quantity parameter may indicate various types or quantities of CSI parameters 335 the UE is to report via the CSI report 320-a. In the example of the CLI reporting scheme 300-a, the CSI report quantity may be set to CQI and SINR, among one or more other CSI parameters 335. A second report quantity parameter may indicate various types or quantities of CLI the UE is to report (e.g., CLI-RSRP, CLI-RSSI, CLI-SINR, or other dedicated reporting metrics for CLI). The UE may perform CSI calculations and CLI calculations within a same time period to generate the metrics requested via the report quantity parameters.

If the UE performs CLI and CSI calculations at the same time, as illustrated in FIG. 3B, the UE may indicate a quantity of supported CSI and CLI calculations within a given time period (e.g., a quantity of supported simultaneous CSI and CLI calculations). The UE may transmit a message to the network entity that indicates the quantity of supported CSI and CLI calculations per component carrier (e.g., a quantity, Ncpu or Ncpu_csi_cli, where Ncpu_csi_cli in such examples may correspond to a quantity of CSI/CLI processing units available for concurrent use by the UE) via a first parameter for calculations associated with a single component carrier (e.g., SimultaneousCSICLI-ReportsPerCC) or via a second parameter for calculations across all component carriers (e.g., simultaneousCSICLI-ReportsAllCC), or both.

In some examples, the first and/or second parameters used to indicate the quantity of calculations, Ncpu, may also be used to indicate a quantity of simultaneous CSI calculations supported by the UE, but with different values. That is, the UE may reuse the first and/or second parameters. In some examples, the UE may transmit two values via the first and/or second parameters, where one value indicates the quantity of CLI and CSI computations the UE supports and where another value indicates the quantity of CSI computations the UE supports. In some other examples, the UE may indicate the quantity of CSI and CLI computations the UE supports via a third parameter (e.g., a quantity, Ncpu_csi_cli) defined for the purpose of indicating the supported quantity of combined CSI and CLI calculations, which may correspond to a quantity of CSI/CLI processing units for concurrent use by the UE 215. The quantity of CSI and CLI calculations the UE supports may correspond to a quantity of processing units (e.g., resources, CSI/CLI processing units) for processing CSI and/or CLI reports.

As described herein, the UE may process (e.g., calculate, generate) the CSI report 320-b or the CLI report 325-a during one or more CSI processing units or CLI processing units for a quantity of symbols based on a set of rules or protocols. If the UE reports CLI as independent CLI metrics (e.g., explicitly using dedicated reporting metrics for CLI), as illustrated by the CLI reporting scheme 300-b, the UE may process the CSI report 320-a containing the CLI metrics or the CLI report 325-a within a quantity (e.g., $O_{CPU}$) of one or more processing units. In some examples, the UE may process the report within a single processing unit, or the UE may process the report within multiple (K) processing units (e.g., $O_{CPU}=1$ or $O_{CPU}=K$). The quantity, K, may be equal to or may be associated with a quantity of CLI resources associated with the CLI reporting. For example, K may be based on how many CLI resources the UE performs the CLI measurements 330 within. K may be configured by a network entity, in some examples. The UE may thereby utilize one or more processing units to process or generate a CSI report 320-b or a CLI report 325-a that includes explicit CLI metrics (e.g., with CSI-ReportConfig with higher layer parameter reportQuantity set to 'cri-cli-RSRP,' 'cri-cli-RSSI,' or 'cri-cli-SINR,' and with CSI-RS-ResourceSet with higher layer parameter trs-info not configured).

In some examples, the UE may report the CLI jointly with CSI (e.g., CLI is jointly reported as CSI and CLI) via the CSI report 320-b, for example. The UE may consider the interference from both CSI IMRs or other CSI interference measurements, and other IMRs for CLI and may capture the interference via the CSI parameters 335 (e.g., CSI metrics), such as CQI, SINR, or other CSI parameters 335. In such cases, if the CSI report 320-b is configured, via a CSI report configuration, with a report quantity set to one or more joint CLI and CSI reporting parameters, the processing of the CSI report 320-b may occupy a quantity of processing units for a quantity of symbols based on at least a first quantity of resources for CSI measurement in accordance with one or more rules or protocols. The joint CLI and CSI reporting parameters indicated by the report quantity parameter in the CSI report configuration may, for example, include 'cri-RI-PMI-CQI-cli-x', 'cri-RI-i1-cli-x', 'cri-RI-i1-CQI-cli-x', 'cri-RI-CQI-cli-x', or 'cri-RI-LI-PMI-CQI-cli-x,' or some other parameters, where x may refer to a CSI parameter 335, such as RSRP, RSSI, SINR, or the like.

If the UE reports the CLI implicitly via the CSI report 320-b, the quantity of processing units may include a first quantity of resources (Ks) for CSI measurement (e.g., NZP-CSI CMRs) and a second quantity of one or more resources for CLI measurement. In some examples, the second quantity may be one (e.g., $O_{CPU}=Ks+1$). That is, the UE may be configured to measure CLI in a single CSI processing unit. Additionally, or alternatively, the second quantity may be one or more based on a CLI resource parameter, Ns (e.g., $O_{CPU}=Ks+Ns$). The first quantity of CMRs, the second quantity of CLI resources, or both, may be configured by a network entity. The network entity may configure the first and/or second quantities dynamically or semi-statically based on one or more system parameters.

As described herein, the UE may obtain CSI measurements and CLI measurements 330 within a same time period and may report the CLI measurements 330 as explicit CLI metrics via the CSI report 320-b with other CSI parameters 335, or via some other type of report, such as the CLI report 325-a. In some examples, the CLI report 325-a may represent an example of a CSI report 320 without other CSI parameters 335. The processing of the CSI and CLI simultaneously may occupy a quantity of resources for a quantity of symbols based on a network entity configuration.

FIG. 3C illustrates a third example of a CLI reporting scheme 300-c. The third example CLI reporting scheme 300-c may include the UE performing CLI reporting independently or separately from CSI reporting. For example, the UE may obtain the CLI measurements 330 and may report the CLI via a report, such as the CLI report 325-b, at a different time than the UE obtains and reports CSI parameters 335.

The UE may generate the CLI report 325-b based on one or more parameters indicated via higher layer signaling, such as RRC signaling or some other type of signaling. For example, the UE may receive control signaling that indicates a CSI or CLI report configuration, with an independent report quantity parameter for CLI. The report quantity parameter for CLI may indicate various types or quantities of CLI the UE is to report (e.g., CLI-RSRP, CLI-RSSI, CLI-SINR, or other dedicated reporting metrics for CLI without simultaneous CSI calculations). The UE may perform one or more CLI calculations within a same time period to generate the measurements requested via the report quantity parameter. In some examples, the CLI report 325-b may represent an example of a CSI report 320 that does not include other CSI parameters 335, or some other type of report.

As described herein, the UE may perform one or more CLI calculations at the same time or within a same time period (e.g., simultaneously). The UE may report CLI via a CLI report 325-a, or some other type or report (e.g., the CLI may be explicitly captured in a CLI or CSI report using independent report configurations). In this example, the UE may transmit a message to the network entity that indicates a quantity (e.g., Ncpu_cli, which in such examples may correspond to a quantity of CLI processing units available for concurrent use by the UE 215) of supported CLI calculations per component carrier (e.g., SimultaneousCLI-ReportsPerCC) or across all component carriers (e.g., simultaneousCLI-ReportsAllCC), or both, within a given time period. In some examples, the one or more parameters via which the UE indicates the quantity of supported CLI calculations may be defined for CLI and may be different than parameters for indicating a quantity of supported CSI calculations, or other types of calculations. The quantity of CLI calculations the UE supports may correspond to a quantity of processing units (e.g., resources) for processing CLI reports.

The UE may process (e.g., calculate, generate) the CLI report 325-b during one or more CSI processing units, CLI processing units, or both for a quantity of symbols based on a set of rules or protocols. If the UE reports CLI as independent CLI metrics separate from CSI, as illustrated by the CLI reporting scheme 300-c, the UE may process the CLI report 325-b containing the CLI metrics within one or more processing units (e.g., $O_{CPU}$ processing units). In some examples, the UE may process the report within a single processing unit, or the UE may process the report within a quantity, K, of multiple processing units (e.g., $O_{CPU}$=1 or $O_{CPU}$=K). The quantity, K, may be equal to or may be associated with a quantity of CLI resources associated with the CLI reporting. For example, K may be based on how many CLI resources the UE performs the CLI measurements 330 within. K may be configured by a network entity, in some examples. The UE may thereby utilize one or more processing units to process or generate a CLI report 325-a that includes explicit CLI metrics (e.g., with CSI-ReportConfig with higher layer parameter reportQuantity set to 'cri-cli-RSRP,' 'cri-cli-RSSI,' or 'cri-cli-SINR,' and with CSI-RS-ResourceSet with higher layer parameter trs-info not configured).

As described herein, the UE may obtain multiple CLI measurements 330 within a same time period and may obtain one or more CSI measurements at a different time. The UE may report the CLI measurements 330 independently via the CLI report 325-b or via a CSI report 320 that does not include other CSI parameters 335. The processing of the CLI simultaneously may occupy a quantity of processing units for a quantity of symbols based on a network entity configuration.

A UE as described herein may report CLI implicitly via a CSI report 320 or explicitly as an independent parameter via a CSI report 320 or a CLI report 325. The UE may perform the CLI calculations at the same time as or at a different time than one or more CSI calculations. To indicate a quantity of supported simultaneous CLI calculations or CLI and CSI calculations (e.g., Ncpu, Ncpu_csi_cli, Ncpu_cli, or some combination thereof), the UE may transmit, via a message or some other type of UE capability signaling, one or more parameters that indicate the quantity of supported CLI and/or CSI calculations in a component carrier (e.g., simultaneousCSI-ReportsPerCC) or across all component carriers (e.g., simultaneousCSI-ReportsAllCC).

Figure 4:
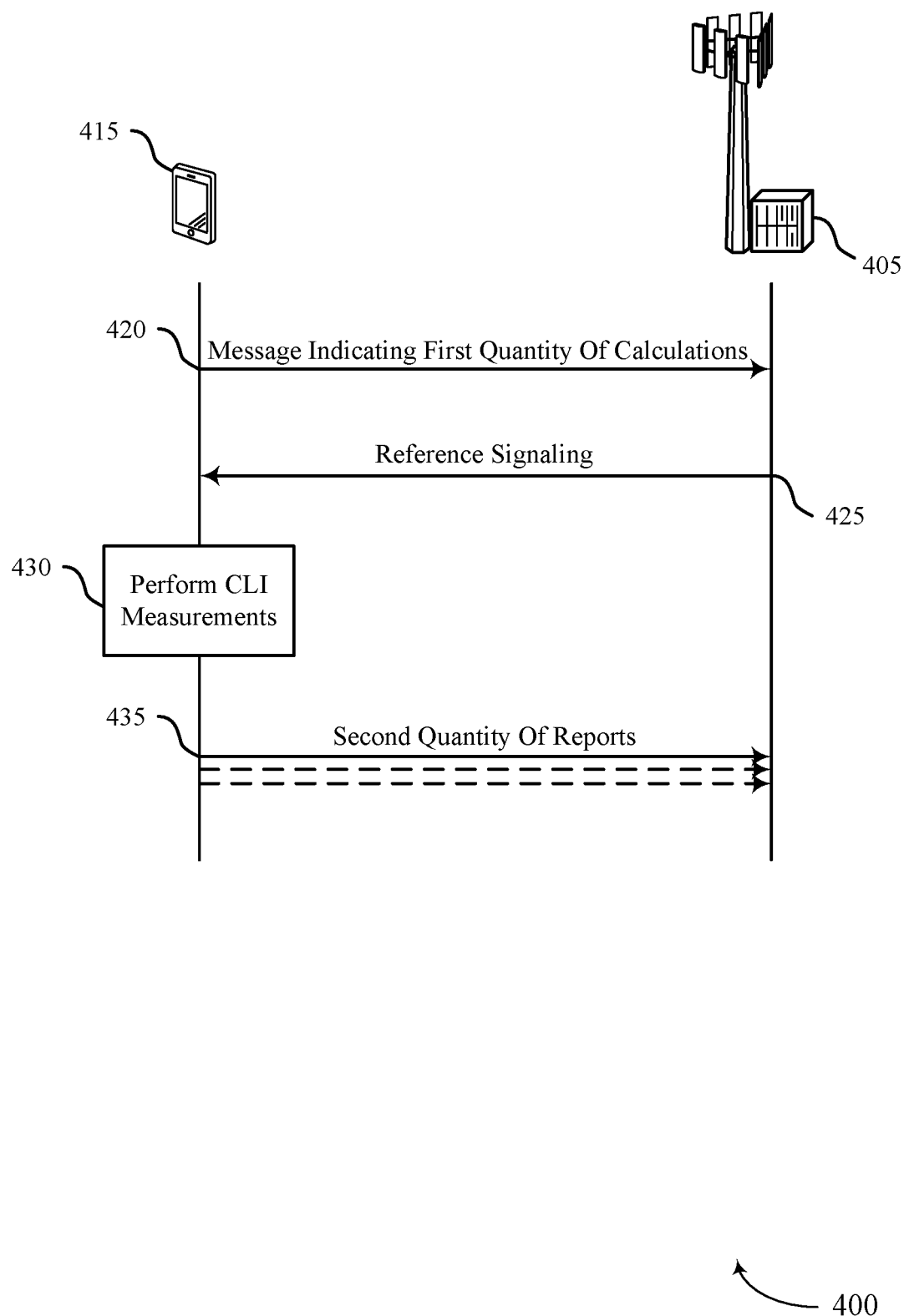
FIG. 4 shows an example of a process flow that supports CLI reporting for wireless communications in accordance with one or more aspects of the present disclosure.

FIG. 4 shows an example of a process flow 400 that supports CLI reporting for wireless communications in accordance with one or more aspects of the present disclosure. The process flow 400 may implement or be implemented by aspects of the wireless communications systems 100 and 200 or the CLI reporting schemes 300 described with reference to FIGS. 1-3. For example, the process flow 400 illustrates communications between a UE 415 and a network entity 405, which may represent aspects of UEs and network entities as described with reference to FIGS. 1-3. In some aspects, the UE 415 may indicate a quantity of calculations and corresponding reports that the UE 415 is capable of processing within a same time period to the network entity 405 to improve calculation of CLI, CLI and CSI, or both.

In the following description of the process flow 400, the operations between the UE 415 and the network entity 405 may be performed in different orders or at different times. Some operations may also be left out of the process flow 400, or other operations may be added. Although the UE 415 and the network entity 405 are shown performing the operations of the process flow 400, some aspects of some operations may also be performed by one or more other wireless devices.

At 420, the UE 415 may transmit, to the network entity 405, a message that indicates a first quantity of calculations that the UE is capable of performing within a same time period (e.g., simultaneously or at least partially concurrently). The first quantity of calculations (e.g., Ncpu, Ncpu_csi_cli, or Ncpu_cli) may include at least one calculation that is based on CLI measurements at the UE 415. The UE 415 may support up to a first quantity of reports based on the first quantity of calculations. For example, the first quantity of reports may be the same as the first quantity of calculations (e.g., a one-to-one mapping) or the first quantity of reports may otherwise be related to or based on the first quantity of calculations (e.g., a one-to-many relationship, or some other type of relationship). The first quantity of reports may include CLI reports, CSI reports based on CLI measurements, CSI reports that indicate CLI, other types of reports, or any combination thereof.

In some examples, the UE 415 may transmit, to the network entity 405, a capability message that indicates a capability of the UE 415 to measure and report the CLI measurements within the same time period as CSI measurements. The UE 415 may determine the first quantity of reports that the UE 415 can support based on the UE capability. For example, if the UE 415 is capable of measuring and reporting CLI and CSI at the same time, the UE 415 may indicate a total quantity of CLI and CSI reports and corresponding calculations that the UE 415 can support. The network entity 405 may schedule subsequent communications with the UE 415 based on the UE capability.

At 425, in some examples, the network entity 405 may transmit reference signaling to the UE 415. For example, the network entity 405 may transmit one or more reference signals or some other type of signaling to the UE 415. The reference signaling may be configured for or may support measurements of CSI, CLI, one or more other channel measurements, or any combination thereof by the UE 415.

At 430, the UE 415 may perform the one or more CLI measurements. For example, the UE 415 may measure CLI using one or more CLI measurement resources. The CLI measurements may indicate interference experienced by the UE 415 due to transmissions or other communications by one or more neighboring UEs. For example, the UE 415 may experience CLI from another UE in a same cell as the UE 415, from another UE in a different cell than the UE 415, or both (e.g., UE-to-UE CLI). In some examples, the UE 415 may perform the one or more CLI measurements based on the reference signaling received at 425. For example, the UE 415 may receive the reference signaling via the one or more CLI measurement resources.

The UE 415 may generate a second quantity of one or more reports based on the one or more CLI measurements. In some examples, the UE 415 may receive control signaling that includes a CSI report configuration, a CLI report configuration, or both. The report configuration in the control signaling may include one or more resource indicators associated with one or more different types of measurements. For example, the network entity 405 may transmit a CSI report configuration to the UE 415 that includes a request for the UE 415 to report one or more different types of CSI parameters based on CLI measurements, or that indicates one or more different types of CSI parameters and one or more different types of CLI parameters for the UE 415 to report. Additionally, or alternatively, the network entity 405 may transmit a CSI or CLI report configuration to the UE 415 that includes a request for the UE 415 to report one or more different types of CLI parameters or joint CSI and CLI parameters, or both, as described in further detail elsewhere herein, including with reference to FIGS. 2 and 3.

At 435, the UE 415 may transmit the second quantity of one or more reports based on the CLI measurements. The second quantity of one or more reports that the UE 415 transmits may be less than or equal to the first quantity of reports that the UE 415 is able to support. In some examples, the UE 415 may perform one or more calculations (e.g., less than or equal to the first quantity of calculations) to generate the second quantity of one or more reports.

Figure 5:
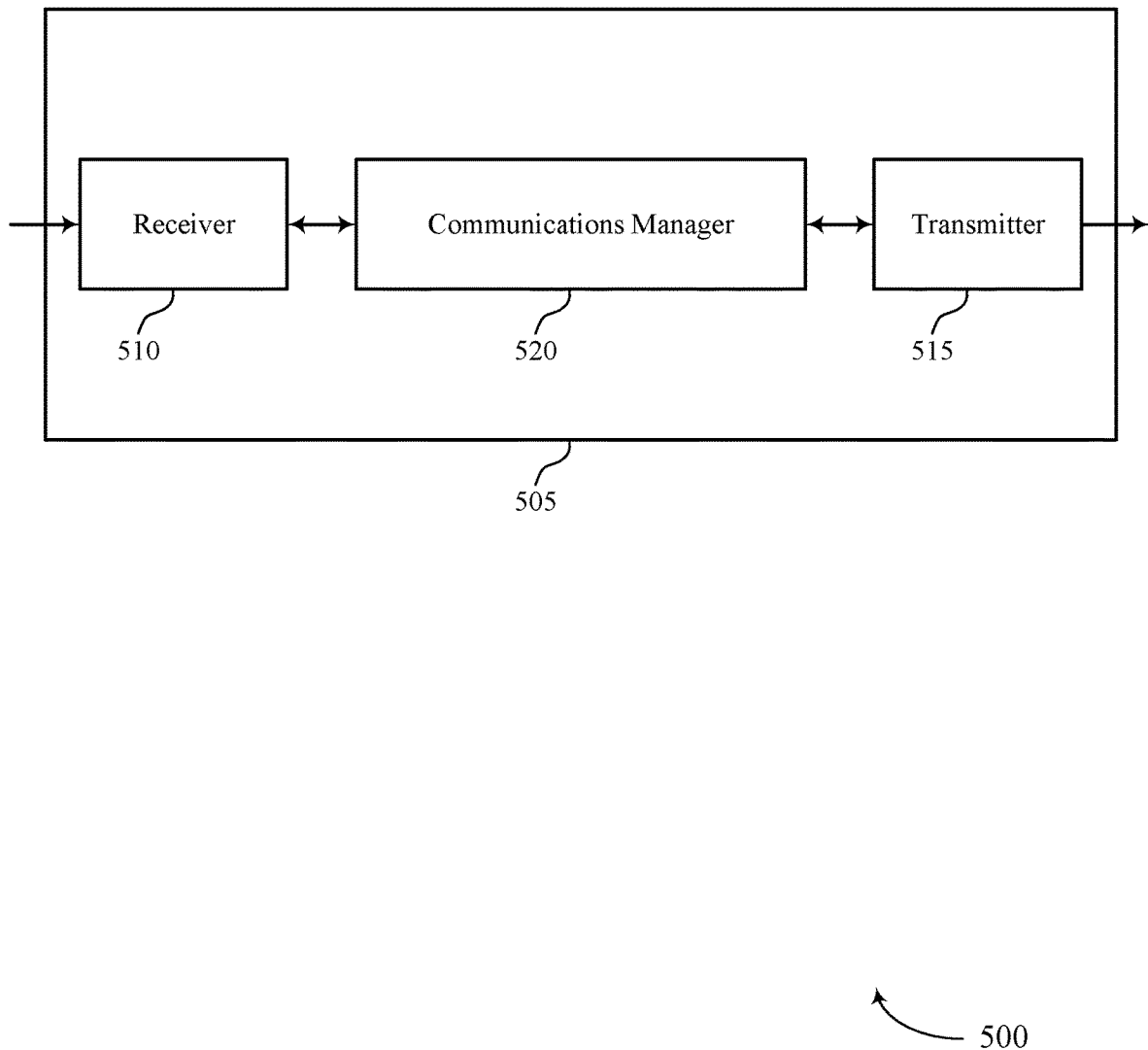
FIGS. 5 and 6 show block diagrams of devices that support CLI reporting for wireless communications in accordance with one or more aspects of the present disclosure.

FIG. 5 shows a block diagram 500 of a device 505 that supports CLI reporting for wireless communications in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include one or more processors, which may be coupled with one or more memories, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to CLI reporting for wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to CLI reporting for wireless communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of CLI reporting for wireless communications as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, one or more processors and one or more memories coupled with the one or more processors may be configured to perform one or more of the functions described herein (e.g., by one or more processors, individually or collectively, executing instructions stored in the one or more memories).

Additionally, or alternatively, the communications manager 520, the receiver 510, the transmitter 515, or various combinations or components thereof may be implemented in code (e.g., as communications management software or firmware) executed by one or more processors. If implemented in code executed by one or more processors, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 is capable of, configured to, or operable to support a means for transmitting a message that indicates a first quantity of calculations that the UE is capable of performing within a same time period, where the first quantity of calculations includes at least one calculation that is based on one or more CLI measurements at the UE, and where a first quantity of reports supported by the UE is based on the first quantity of calculations. The communications manager 520 is capable of, configured to, or operable to support a means for performing the one or more CLI measurements using one or more CLI resources, where the one or more CLI measurements correspond to interference at the UE based on communications by at least a second UE. The communications manager 520 is capable of, configured to, or operable to support a means for transmitting a second quantity of one or more reports based on the one or more CLI measurements, where the second quantity of one or more reports is less than or equal to the first quantity of reports in accordance with the message.

By including or configuring the communications manager 520 in accordance with examples as described herein, the device 505 (e.g., one or more processors controlling or otherwise coupled with the receiver 510, the transmitter 515, the communications manager 520, or a combination thereof) may support techniques for reduced processing, reduced power consumption, and more efficient utilization of communication resources, among other possibilities.

Figure 6:
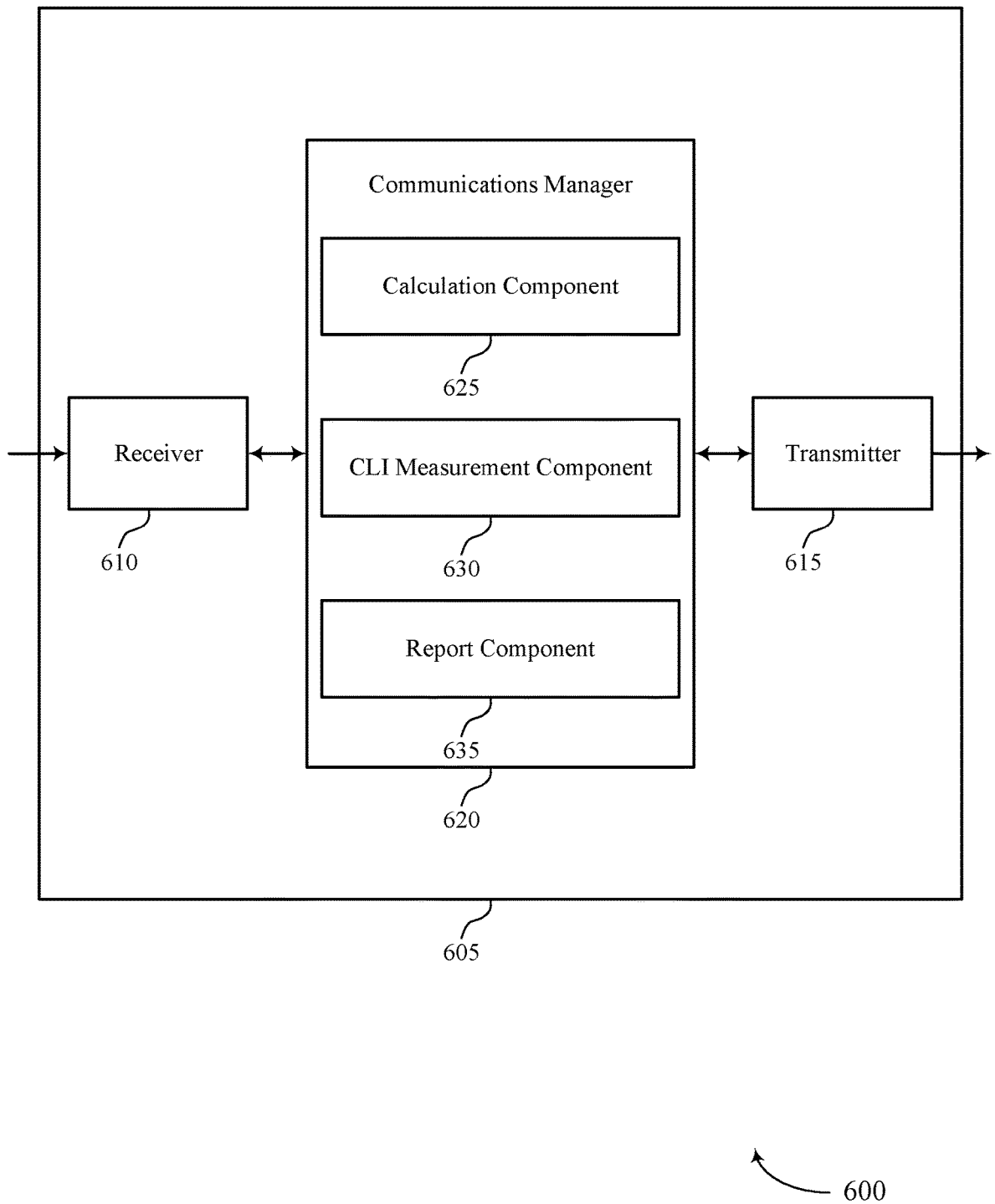

FIG. 6 shows a block diagram 600 of a device 605 that supports CLI reporting for wireless communications in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include one or more processors, which may be coupled with one or more memories, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to CLI reporting for wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to CLI reporting for wireless communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of CLI reporting for wireless communications as described herein. For example, the communications manager 620 may include a calculation component 625, a CLI measurement component 630, a report component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The calculation component 625 is capable of, configured to, or operable to support a means for transmitting a message that indicates a first quantity of calculations that the UE is capable of performing within a same time period, where the first quantity of calculations includes at least one calculation that is based on one or more CLI measurements at the UE, and where a first quantity of reports supported by the UE is based on the first quantity of calculations. The CLI measurement component 630 is capable of, configured to, or operable to support a means for performing the one or more CLI measurements using one or more CLI resources, where the one or more CLI measurements correspond to interference at the UE based on communications by at least a second UE. The report component 635 is capable of, configured to, or operable to support a means for transmitting a second quantity of one or more reports based on the one or more CLI measurements, where the second quantity of one or more reports is less than or equal to the first quantity of reports in accordance with the message.

Figure 7:
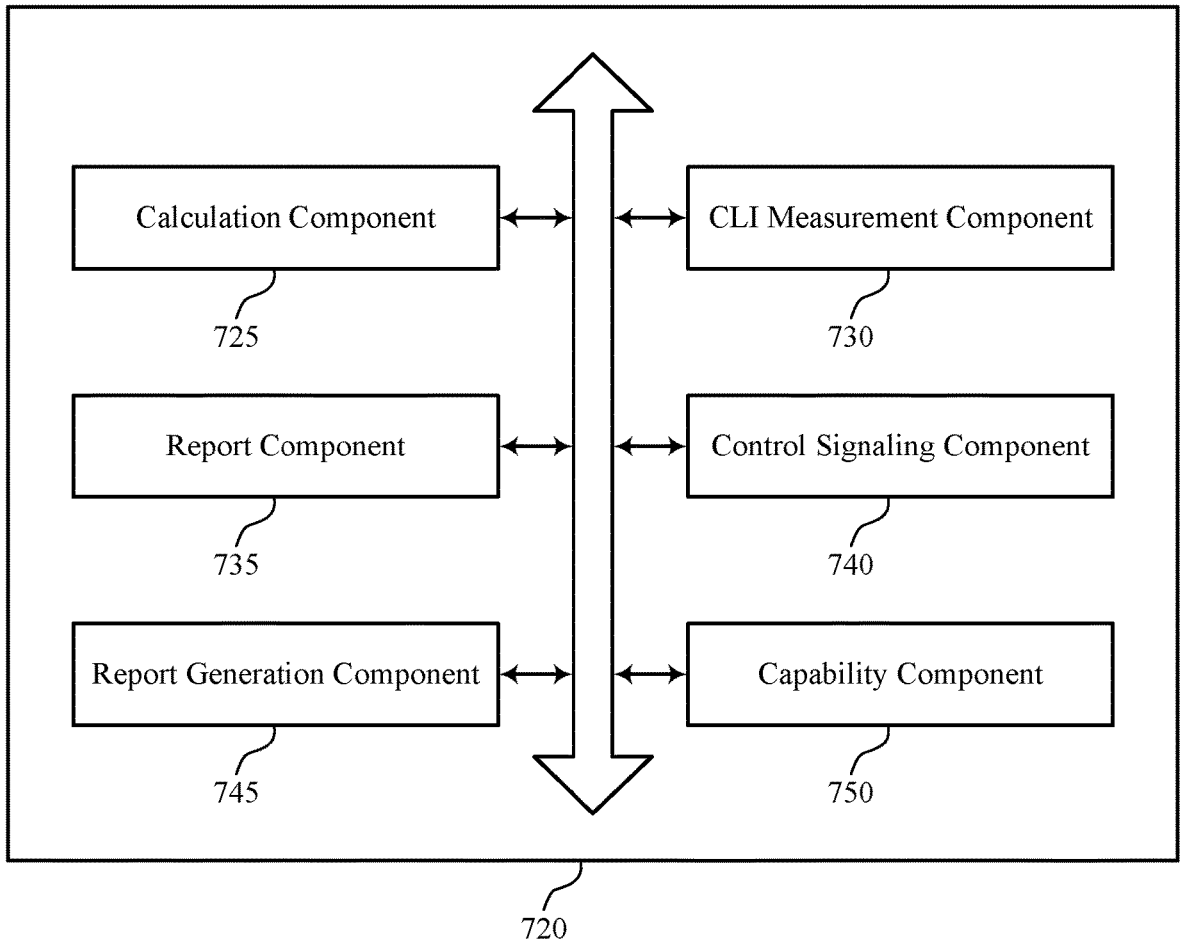
FIG. 7 shows a block diagram of a communications manager that supports CLI reporting for wireless communications in accordance with one or more aspects of the present disclosure.

FIG. 7 shows a block diagram 700 of a communications manager 720 that supports CLI reporting for wireless communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of CLI reporting for wireless communications as described herein. For example, the communications manager 720 may include a calculation component 725, a CLI measurement component 730, a report component 735, a control signaling component 740, a report generation component 745, a capability component 750, or any combination thereof. Each of these components, or components or subcomponents thereof (e.g., one or more processors, one or more memories), may communicate, directly or indirectly, with one another (e.g., via one or more buses).

The communications manager 720 may support wireless communication at a UE in accordance with examples as disclosed herein. The calculation component 725 is capable of, configured to, or operable to support a means for transmitting a message that indicates a first quantity of calculations that the UE is capable of performing within a same time period, where the first quantity of calculations includes at least one calculation that is based on one or more CLI measurements at the UE, and where a first quantity of reports supported by the UE is based on the first quantity of calculations. The CLI measurement component 730 is capable of, configured to, or operable to support a means for performing the one or more CLI measurements using one or more CLI resources, where the one or more CLI measurements correspond to interference at the UE based on communications by at least a second UE. The report component 735 is capable of, configured to, or operable to support a means for transmitting a second quantity of one or more reports based on the one or more CLI measurements, where the second quantity of one or more reports is less than or equal to the first quantity of reports in accordance with the message.

In some examples, to support transmitting the message, the calculation component 725 is capable of, configured to, or operable to support a means for transmitting, via the message, a parameter that indicates the first quantity of calculations that the UE is capable of performing within the same time period, where the first quantity of reports that is based on the first quantity of calculations includes CSI reports that are based on the one or more CLI measurements and are further based one or more other channel quality measurements.

In some examples, to support transmitting the message, the calculation component 725 is capable of, configured to, or operable to support a means for transmitting, via the message, a parameter that indicates the first quantity of calculations that the UE is capable of performing within the same time period, where the first quantity of reports that is based on the first quantity of calculations includes one or more CSI reports, one or more CLI reports, or any combination thereof that indicate the one or more CLI measurements.

In some examples, to support transmitting the message, the calculation component 725 is capable of, configured to, or operable to support a means for transmitting, via the message, a parameter that indicates the first quantity of calculations that the UE is capable of performing within the same time period, where the first quantity of reports that is based on the first quantity of calculations includes one or more CLI reports that indicate the one or more CLI measurements.

In some examples, the calculation component 725 is capable of, configured to, or operable to support a means for transmitting, via the message or a second message, a second parameter that indicates a second quantity of calculations that the UE is capable of performing within the same time period or a different time period, the second quantity of calculations based on one or more CSI measurements and associated with one or more CSI reports different than the one or more CLI reports.

In some examples, the control signaling component 740 is capable of, configured to, or operable to support a means for receiving control signaling including a request for the UE to report the one or more CLI measurements via one or more CLI reports, where the control signaling includes one more resource indicators associated with the one or more CLI measurements. In some examples, the report generation component 745 is capable of, configured to, or operable to support a means for generating, based on the control signaling, each report of the second quantity of one or more reports using a single processing unit, where the second quantity of one or more reports includes CLI reports.

In some examples, the control signaling component 740 is capable of, configured to, or operable to support a means for receiving control signaling including a request for the UE to report the one or more CLI measurements via one or more CLI reports, where the control signaling includes one more resource indicators associated with the one or more CLI measurements. In some examples, the report generation component 745 is capable of, configured to, or operable to support a means for generating, based on the control signaling, each report of the second quantity of one or more reports using a quantity of processing units, where the second quantity of one or more reports includes CLI reports, and where the quantity of processing resources is based on a quantity of CLI resources.

In some examples, the control signaling component 740 is capable of, configured to, or operable to support a means for receiving control signaling including a request for the UE to report the one or more CLI measurements via one or more CSI reports, where the control signaling includes one or more resource indicators associated with CSI measurements. In some examples, the report generation component 745 is capable of, configured to, or operable to support a means for generating, based on the control signaling, each report of the second quantity of one or more reports using a quantity of processing units, where the quantity of processing units is based on a quantity of CSI resources allocated for channel measurement. In some examples, the quantity of processing resources is further based on a quantity of one or more CLI resources.

In some examples, the control signaling component 740 is capable of, configured to, or operable to support a means for receiving control signaling including a request for the UE to report the one or more CLI measurements and one or more CSI measurements jointly via the second quantity of one or more reports, where the control signaling includes one or more resource indicators associated with the one or more CSI measurements and the one or more CLI measurements. In some examples, the report component 735 is capable of, configured to, or operable to support a means for generating, based on the control signaling, each report of the second quantity of one or more reports using a quantity of processing units, where the quantity of processing units is based on a quantity of CSI resources allocated for channel measurement, where the second quantity of one or more reports includes one or more CSI reports that are based on the one or more CLI measurements and are further based one or more other channel quality measurements. In some examples, the quantity of processing units is further based on a quantity of one or more CLI resources.

In some examples, the capability component 750 is capable of, configured to, or operable to support a means for transmitting a capability message that indicates a capability of the UE to measure and report the one or more CLI measurements within the same time period as one or more CSI measurements. In some examples, the second quantity of one or more reports includes CSI reports that indicate the one or more CLI measurements based on the capability of the UE.

In some examples, the first quantity of reports includes reports associated with a single component carrier or reports associated with a set of multiple component carriers. In some examples, the first quantity of calculations is equal to the first quantity of reports. In some examples, the one or more CLI resources include CLI resources for RSRP, for RSSI measurements, or both.

In some examples, the first quantity of calculations is based on a quantity of processing units at the UE.

Figure 8:
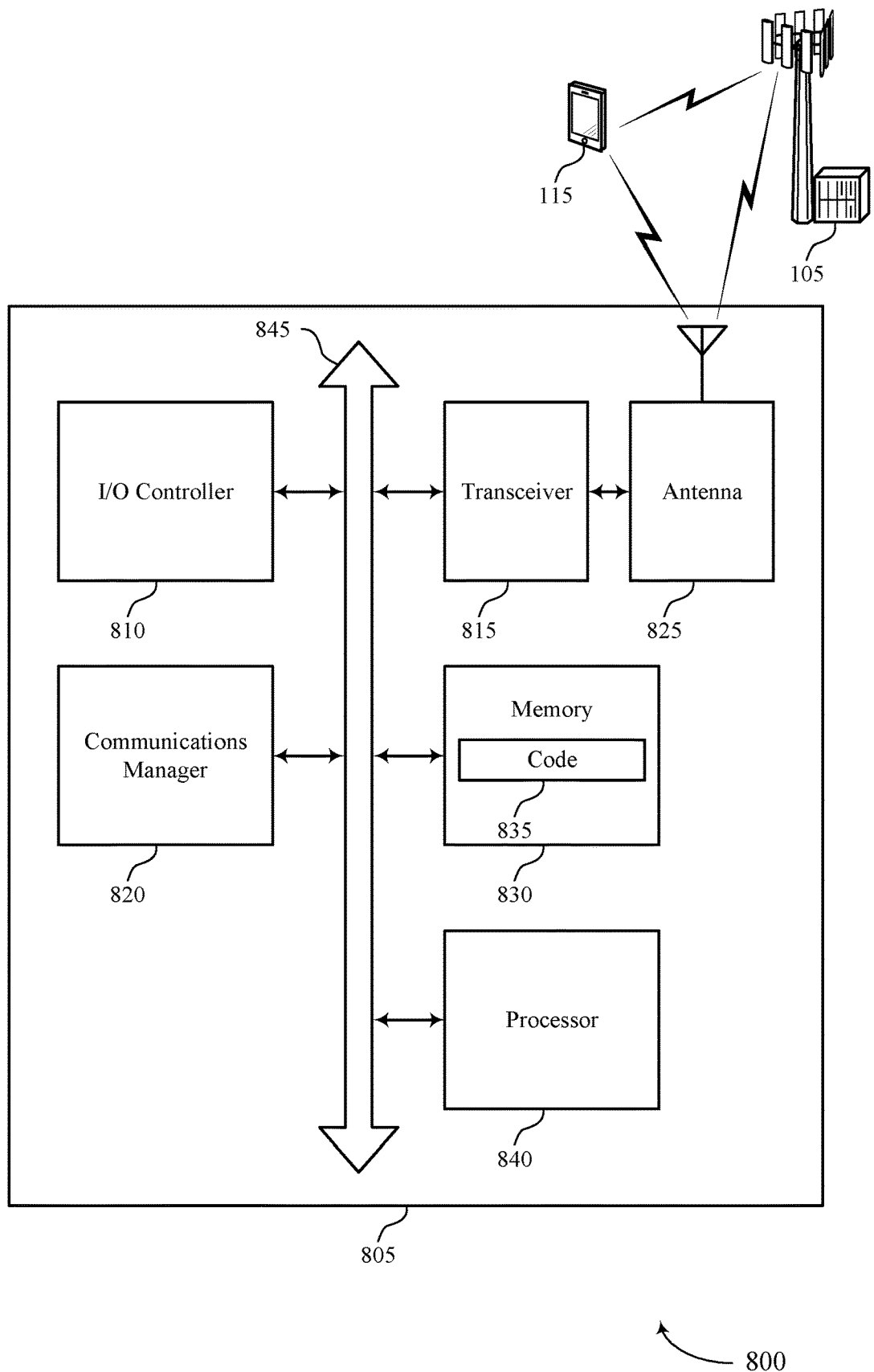
FIG. 8 shows a diagram of a system including a device that supports CLI reporting for wireless communications in accordance with one or more aspects of the present disclosure.

FIG. 8 shows a diagram of a system 800 including a device 805 that supports CLI reporting for wireless communications in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, one or more memories 830, code 835, and one or more processors 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the one or more processors 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The one or more memories 830 may include random access memory (RAM) and read-only memory (ROM). The one or more memories 830 may store computer-readable, computer-executable code 835 including instructions that, when executed by the one or more processors 840, cause the device 805 to perform various functions described herein. The code 835 may be stored in a non-transitory computer-readable medium such as system memory or another type of memory. In some cases, the code 835 may not be directly executable by the one or more processors 840 but may cause a computer (e.g., when compiled and executed) to perform functions described herein. In some cases, the one or more memories 830 may contain, among other things, a basic I/O system (BIOS) which may control basic hardware or software operation such as the interaction with peripheral components or devices.

The one or more processors 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the one or more processors 840 may be configured to operate a memory array using a memory controller. In some other cases, a memory controller may be integrated into the one or more processors 840. The one or more processors 840 may be configured to execute computer-readable instructions stored in a memory (e.g., the one or more memories 830) to cause the device 805 to perform various functions (e.g., functions or tasks supporting CLI reporting for wireless communications). For example, the device 805 or a component of the device 805 may include one or more processors 840 and one or more memories 830 coupled with or to the one or more processors 840, the one or more processors 840 and one or more memories 830 configured to perform various functions described herein. In some examples, the one or more processors 840 may include multiple processors and the one or more memories 830 may include multiple memories. One or more of the multiple processors may be coupled with one or more of the multiple memories, which may, individually or collectively, be configured to perform various functions herein.

The communications manager 820 may support wireless communication at a UE in accordance with examples as disclosed herein. For example, the communications manager 820 is capable of, configured to, or operable to support a means for transmitting a message that indicates a first quantity of calculations that the UE is capable of performing within a same time period, where the first quantity of calculations includes at least one calculation that is based on one or more CLI measurements at the UE, and where a first quantity of reports supported by the UE is based on the first quantity of calculations. The communications manager 820 is capable of, configured to, or operable to support a means for performing the one or more CLI measurements using one or more CLI resources, where the one or more CLI measurements correspond to interference at the UE based on communications by at least a second UE. The communications manager 820 is capable of, configured to, or operable to support a means for transmitting a second quantity of one or more reports based on the one or more CLI measurements, where the second quantity of one or more reports is less than or equal to the first quantity of reports in accordance with the message.

By including or configuring the communications manager 820 in accordance with examples as described herein, the device 805 may support techniques for improved communication reliability, reduced latency, reduced power consumption, more efficient utilization of communication resources, and improved coordination between devices, among other possibilities.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the one or more processors 840, the one or more memories 830, the code 835, or any combination thereof. For example, the code 835 may include instructions executable by the one or more processors 840 to cause the device 805 to perform various aspects of CLI reporting for wireless communications as described herein, or the one or more processors 840 and the one or more memories 830 may be otherwise configured to, individually or collectively, perform or support such operations.

Figure 9:
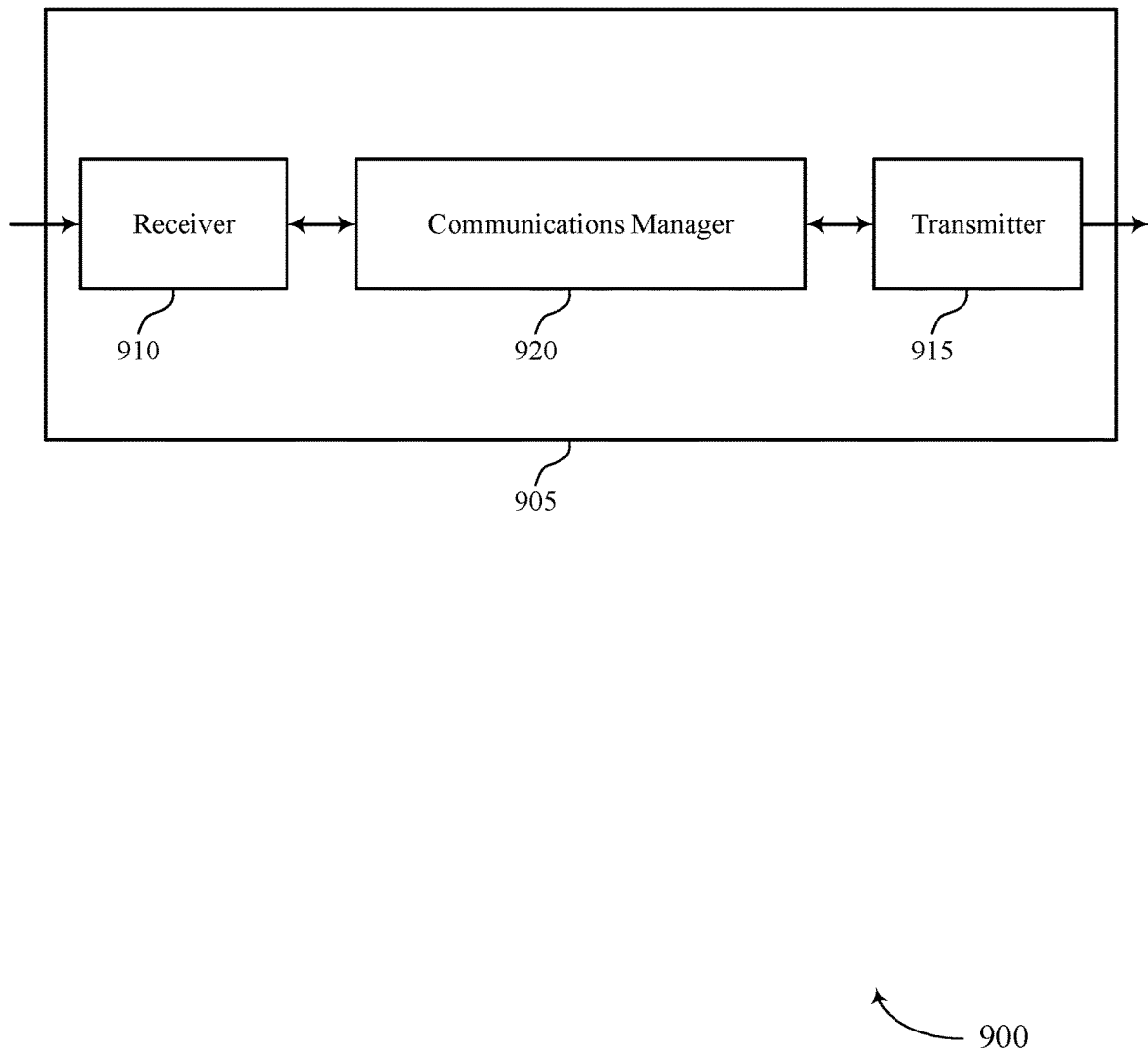
FIGS. 9 and 10 show block diagrams of devices that support CLI reporting for wireless communications in accordance with one or more aspects of the present disclosure.

FIG. 9 shows a block diagram 900 of a device 905 that supports CLI reporting for wireless communications in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include one or more processors, which may be coupled with one or more memories, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of CLI reporting for wireless communications as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, one or more processors and one or more memories coupled with the one or more processors may be configured to perform one or more of the functions described herein (e.g., by one or more processors, individually or collectively, executing instructions stored in the one or more memories).

Additionally, or alternatively, the communications manager 920, the receiver 910, the transmitter 915, or various combinations or components thereof may be implemented in code (e.g., as communications management software or firmware) executed by one or more processors. If implemented in code executed by one or more processors, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 is capable of, configured to, or operable to support a means for receiving, from a UE, a message that indicates a first quantity of calculations that the UE is capable of performing within a same time period, where the first quantity of calculations includes at least one calculations that is based on one or more CLI measurements that correspond to interference at the UE based on communications by at least a second UE, and where a first quantity of reports supported by the UE is based on the first quantity of calculations. The communications manager 920 is capable of, configured to, or operable to support a means for receiving a second quantity of one or more reports based on the one or more CLI measurements, where the second quantity of one or more reports is less than or equal to the first quantity of reports in accordance with the message.

By including or configuring the communications manager 920 in accordance with examples as described herein, the device 905 (e.g., one or more processors controlling or otherwise coupled with the receiver 910, the transmitter 915, the communications manager 920, or a combination thereof) may support techniques for reduced processing, reduced power consumption, more efficient utilization of communication resources, among other possibilities.

Figure 10:
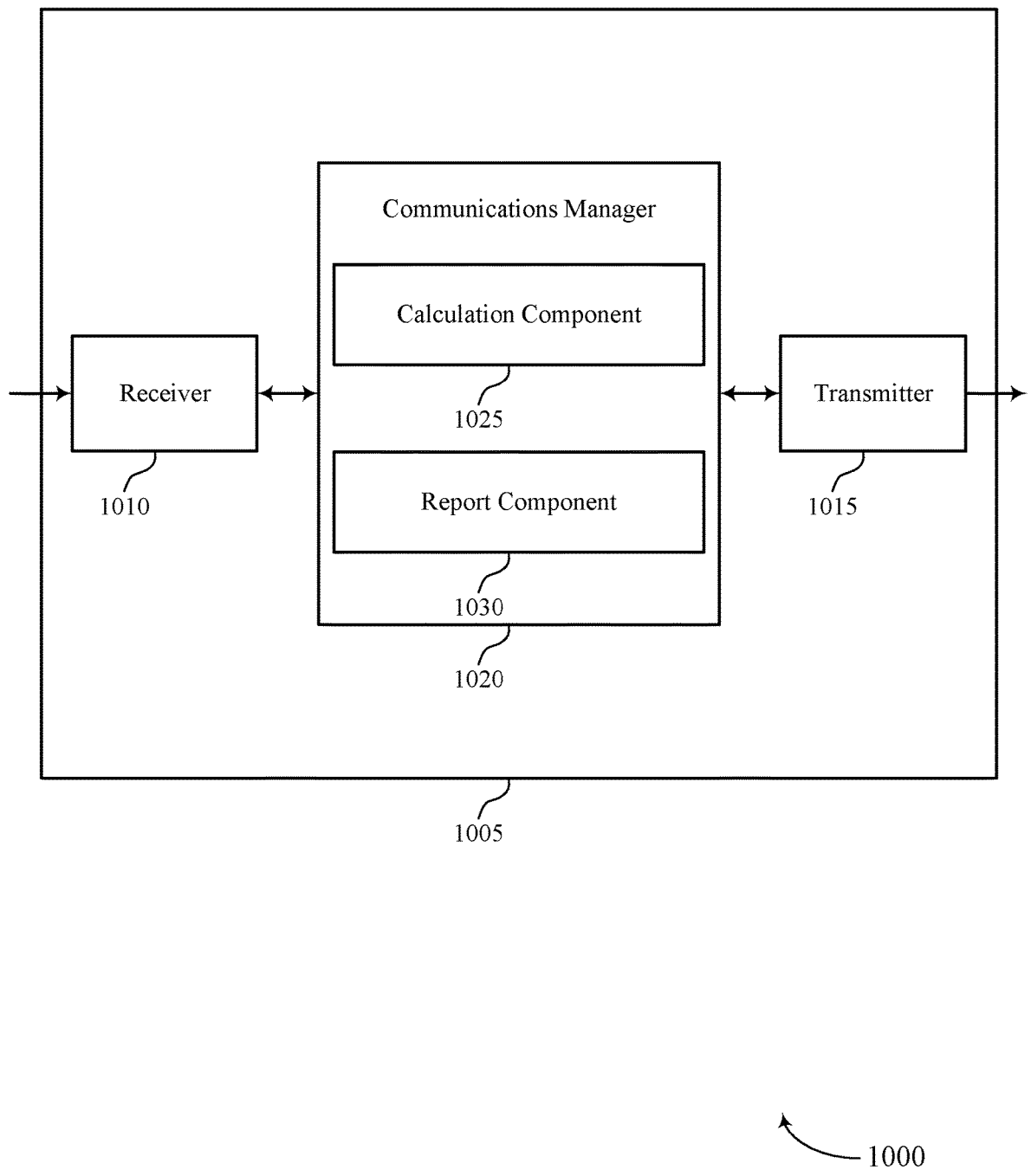

FIG. 10 shows a block diagram 1000 of a device 1005 that supports CLI reporting for wireless communications in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include one or more processors, which may be coupled with one or more memories, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of CLI reporting for wireless communications as described herein. For example, the communications manager 1020 may include a calculation component 1025 a report component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The calculation component 1025 is capable of, configured to, or operable to support a means for receiving, from a UE, a message that indicates a first quantity of calculations that the UE is capable of performing within a same time period, where the first quantity of calculations includes at least one calculations that is based on one or more CLI measurements that correspond to interference at the UE based on communications by at least a second UE, and where a first quantity of reports supported by the UE is based on the first quantity of calculations. The report component 1030 is capable of, configured to, or operable to support a means for receiving a second quantity of one or more reports based on the one or more CLI measurements, where the second quantity of one or more reports is less than or equal to the first quantity of reports in accordance with the message.

Figure 11:
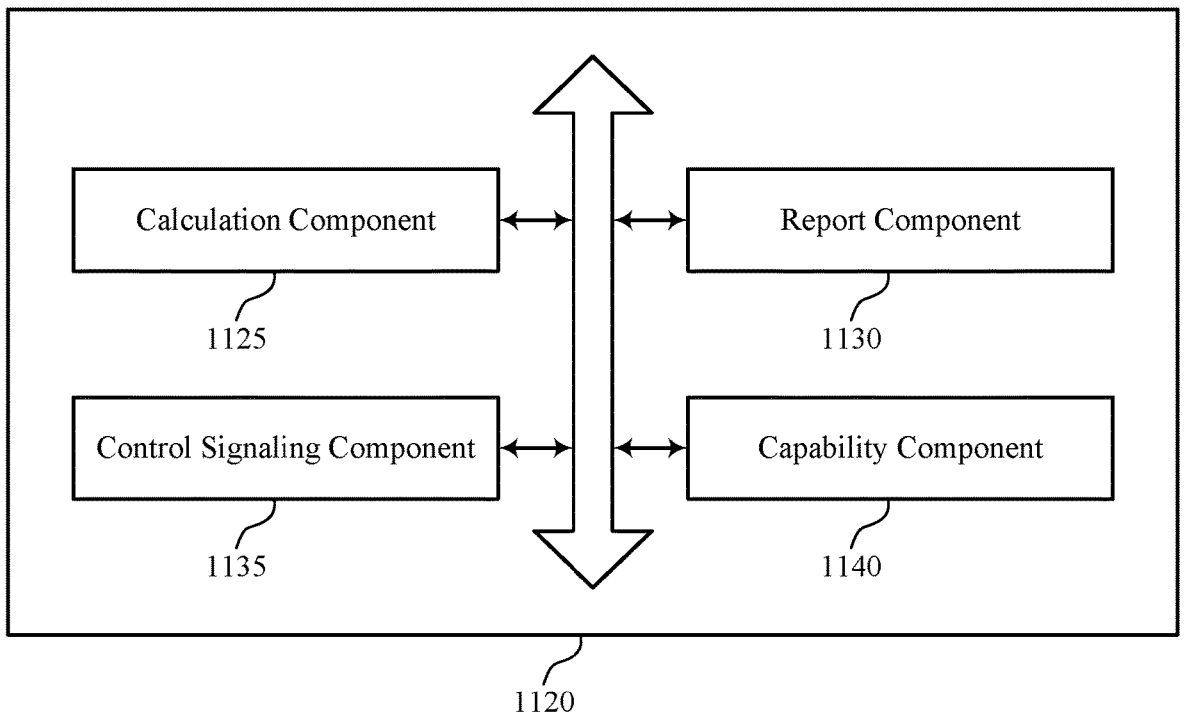
FIG. 11 shows a block diagram of a communications manager that supports CLI reporting for wireless communications in accordance with one or more aspects of the present disclosure.

FIG. 11 shows a block diagram 1100 of a communications manager 1120 that supports CLI reporting for wireless communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of CLI reporting for wireless communications as described herein. For example, the communications manager 1120 may include a calculation component 1125, a report component 1130, a control signaling component 1135, a capability component 1140, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The calculation component 1125 is capable of, configured to, or operable to support a means for receiving, from a UE, a message that indicates a first quantity of calculations that the UE is capable of performing within a same time period, where the first quantity of calculations includes at least one calculations that is based on one or more CLI measurements that correspond to interference at the UE based on communications by at least a second UE, and where a first quantity of reports supported by the UE is based on the first quantity of calculations. The report component 1130 is capable of, configured to, or operable to support a means for receiving a second quantity of one or more reports based on the one or more CLI measurements, where the second quantity of one or more reports is less than or equal to the first quantity of reports in accordance with the message.

In some examples, to support receiving the message, the calculation component 1125 is capable of, configured to, or operable to support a means for receiving, via the message, a parameter that indicates the first quantity of calculations that the UE is capable of performing within the same time period, where the first quantity of reports that is based on the first quantity of calculations includes CSI reports that are based on the one or more CLI measurements and are further based one or more other channel quality measurements.

In some examples, to support receiving the message, the calculation component 1125 is capable of, configured to, or operable to support a means for receiving, via the message, a parameter that indicates the first quantity of calculations that the UE is capable of performing within the same time period, where the first quantity of reports that is based on the first quantity of calculations includes one or more CSI reports, one or more CLI reports, or any combination thereof that indicate the one or more CLI measurements.

In some examples, to support receiving the message, the calculation component 1125 is capable of, configured to, or operable to support a means for receiving, via the message, a parameter that indicates the first quantity of calculations that the UE is capable of performing within the same time period, where the first quantity of reports that is based on the first quantity of calculations includes one or more CLI reports that indicate the one or more CLI measurements.

In some examples, the calculation component 1125 is capable of, configured to, or operable to support a means for receiving, via the message or a second message, a second parameter that indicates a second quantity of calculations that the UE is capable of performing within the same time period or a different time period, the second quantity of calculations based on one or more CSI measurements and associated with one or more CSI reports different than the one or more CLI reports.

In some examples, the control signaling component 1135 is capable of, configured to, or operable to support a means for transmitting control signaling including a request for the UE to report the one or more CLI measurements via one or more CLI reports, where the control signaling includes one more resource indicators associated with the one or more CLI measurements, and where the second quantity of one or more reports includes CLI reports.

In some examples, the control signaling component 1135 is capable of, configured to, or operable to support a means for transmitting control signaling including a request for the UE to report the one or more CLI measurements via one or more CSI reports, where the control signaling includes one more resource indicators associated with CSI measurements, and where the second quantity of one or more reports includes CSI reports.

In some examples, the control signaling component 1135 is capable of, configured to, or operable to support a means for transmitting control signaling including a request for the UE to report the one or more CLI measurements and one or more CSI measurements jointly via the second quantity of one or more reports, where the control signaling includes one more resource indicators associated with the one or more CSI measurements and the one or more CLI measurements, and where the second quantity of one or more reports includes one or more CSI reports that are based on the one or more CLI measurements and are further based on one or more other channel quality measurements.

In some examples, the capability component 1140 is capable of, configured to, or operable to support a means for receiving a capability message that indicates a capability of the UE to measure and report the one or more CLI measurements within the same time period as one or more CSI measurements.

In some examples, the second quantity of one or more reports includes CSI reports that indicate the one or more CLI measurements based on the capability of the UE. In some examples, the first quantity of reports includes reports associated with a single component carrier or reports associated with a set of multiple component carriers. In some examples, the first quantity of calculations is equal to the first quantity of reports.

Figure 12:
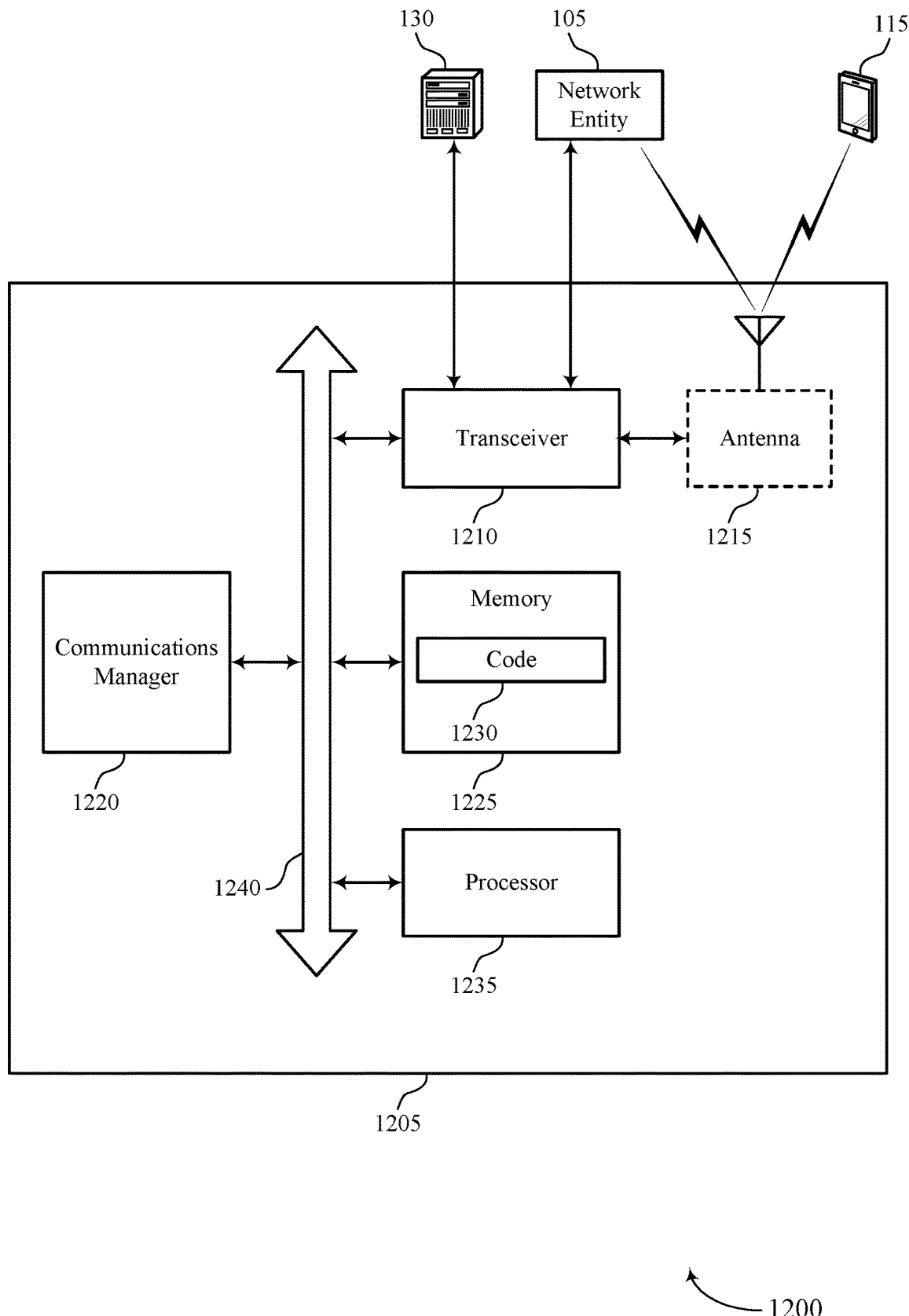
FIG. 12 shows a diagram of a system including a device that supports CLI reporting for wireless communications in accordance with one or more aspects of the present disclosure.

FIG. 12 shows a diagram of a system 1200 including a device 1205 that supports CLI reporting for wireless communications in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, one or more memories 1225, code 1230, and one or more processors 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the one or more processors 1235, the one or more memories 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The one or more memories 1225 may include RAM, ROM, or any combination thereof. The one or more memories 1225 may store computer-readable, computer-executable code 1230 including instructions that, when executed by one or more of the one or more processors 1235, cause the device 1205 to perform various functions described herein. The code 1230 may be stored in a non-transitory computer-readable medium such as system memory or another type of memory. In some cases, the code 1230 may not be directly executable by a processor of the one or more processors 1235 but may cause a computer (e.g., when compiled and executed) to perform functions described herein. In some cases, the one or more memories 1225 may contain, among other things, a BIOS which may control basic hardware or software operation such as the interaction with peripheral components or devices. In some examples, the one or more processors 1235 may include multiple processors and the one or more memories 1225 may include multiple memories. One or more of the multiple processors may be coupled with one or more of the multiple memories which may, individually or collectively, be configured to perform various functions herein (for example, as part of a processing system).

The one or more processors 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the one or more processors 1235 may be configured to operate a memory array using a memory controller. In some other cases, a memory controller may be integrated into one or more of the one or more processors 1235. The one or more processors 1235 may be configured to execute computer-readable instructions stored in a memory (e.g., one or more of the one or more memories 1225) to cause the device 1205 to perform various functions (e.g., functions or tasks supporting CLI reporting for wireless communications). For example, the device 1205 or a component of the device 1205 may include one or more processors 1235 and one or more memories 1225 coupled with one or more of the one or more processors 1235, the one or more processors 1235 and the one or more memories 1225 configured to perform various functions described herein. The one or more processors 1235 may be an example of a cloud-computing platform (e.g., one or more physical nodes and supporting software such as operating systems, virtual machines, or container instances) that may host the functions (e.g., by executing code 1230) to perform the functions of the device 1205. The one or more processors 1235 may be any one or more suitable processors capable of executing scripts or instructions of one or more software programs stored in the device 1205 (such as within one or more of the one or more memories 1225). In some implementations, the one or more processors 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the one or more processors 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the one or more memories 1225, the code 1230, and the one or more processors 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 is capable of, configured to, or operable to support a means for receiving, from a UE, a message that indicates a first quantity of calculations that the UE is capable of performing within a same time period, where the first quantity of calculations includes at least one calculations that is based on one or more CLI measurements that correspond to interference at the UE based on communications by at least a second UE, and where a first quantity of reports supported by the UE is based on the first quantity of calculations. The communications manager 1220 is capable of, configured to, or operable to support a means for receiving a second quantity of one or more reports based on the one or more CLI measurements, where the second quantity of one or more reports is less than or equal to the first quantity of reports in accordance with the message.

By including or configuring the communications manager 1220 in accordance with examples as described herein, the device 1205 may support techniques for improved communication reliability, reduced latency, reduced power consumption, more efficient utilization of communication resources, and improved coordination between devices, among other possibilities.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the one or more processors 1235, one or more of the one or more memories 1225, the code 1230, or any combination thereof (for example, by a processing system including at least a portion of the one or more processors 1235, the one or more memories 1225, the code 1230, or any combination thereof). For example, the code 1230 may include instructions executable by one or more of the one or more processors 1235 to cause the device 1205 to perform various aspects of CLI reporting for wireless communications as described herein, or the one or more processors 1235 and the one or more memories 1225 may be otherwise configured to, individually or collectively, perform or support such operations.

Figure 13:
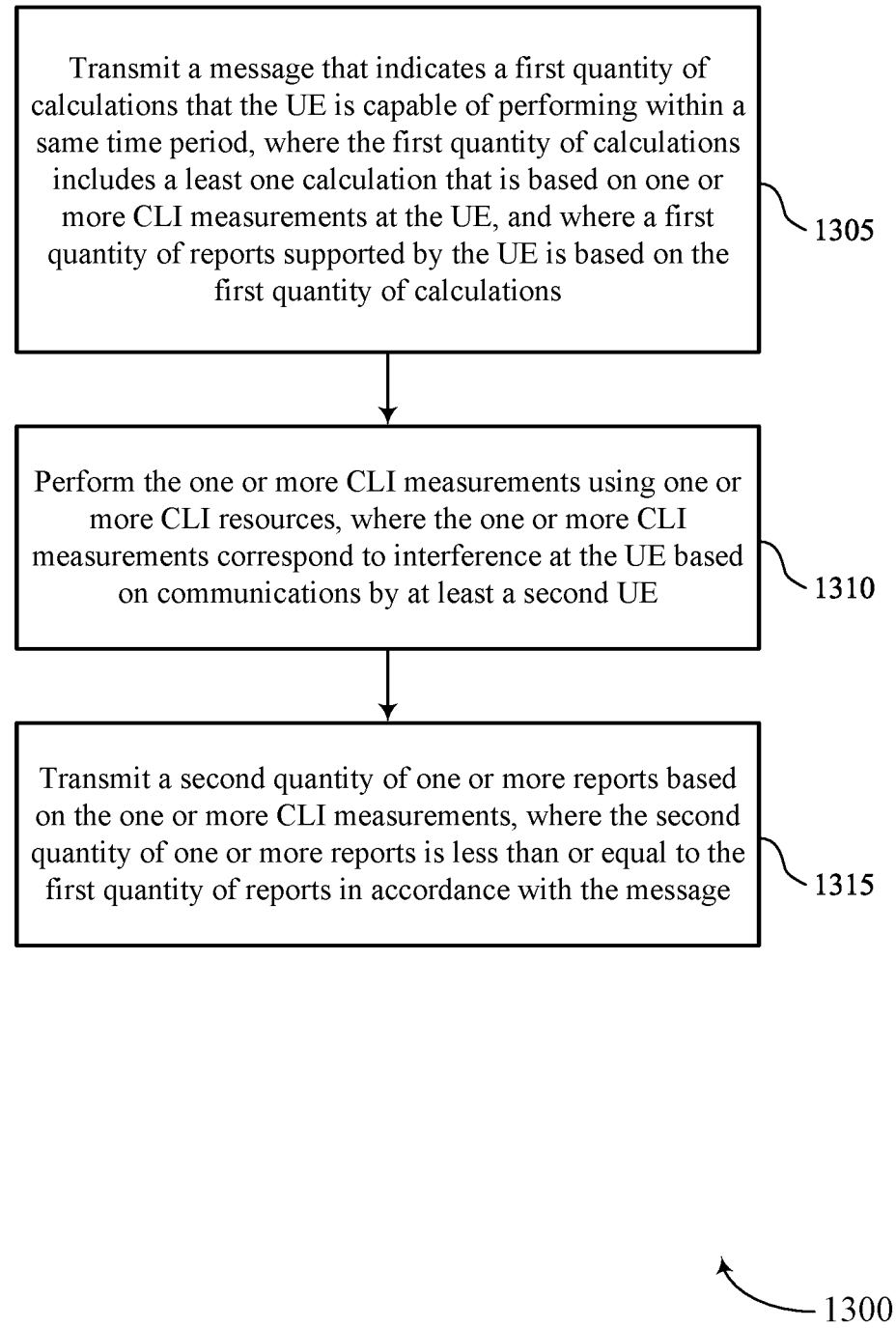
FIGS. 13 through 17 show flowcharts illustrating methods that support CLI reporting for wireless communications in accordance with one or more aspects of the present disclosure.

FIG. 13 shows a flowchart illustrating a method 1300 that supports CLI reporting for wireless communications in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting a message that indicates a first quantity of calculations that the UE is capable of performing within a same time period, where the first quantity of calculations includes at least one calculation that is based on one or more CLI measurements at the UE, and where a first quantity of reports supported by the UE is based on the first quantity of calculations. The operations of block 1305 may be performed in accordance with examples as disclosed herein. In some examples, aspects of the operations of 1305 may be performed by a calculation component 725 as described with reference to FIG. 7.

At 1310, the method may include performing the one or more CLI measurements using one or more CLI resources, where the one or more CLI measurements correspond to interference at the UE based on communications by at least a second UE. The operations of block 1310 may be performed in accordance with examples as disclosed herein. In some examples, aspects of the operations of 1310 may be performed by a CLI measurement component 730 as described with reference to FIG. 7.

At 1315, the method may include transmitting a second quantity of one or more reports based on the one or more CLI measurements, where the second quantity of one or more reports is less than or equal to the first quantity of reports in accordance with the message. The operations of block 1315 may be performed in accordance with examples as disclosed herein. In some examples, aspects of the operations of 1315 may be performed by a report component 735 as described with reference to FIG. 7.

Figure 14:
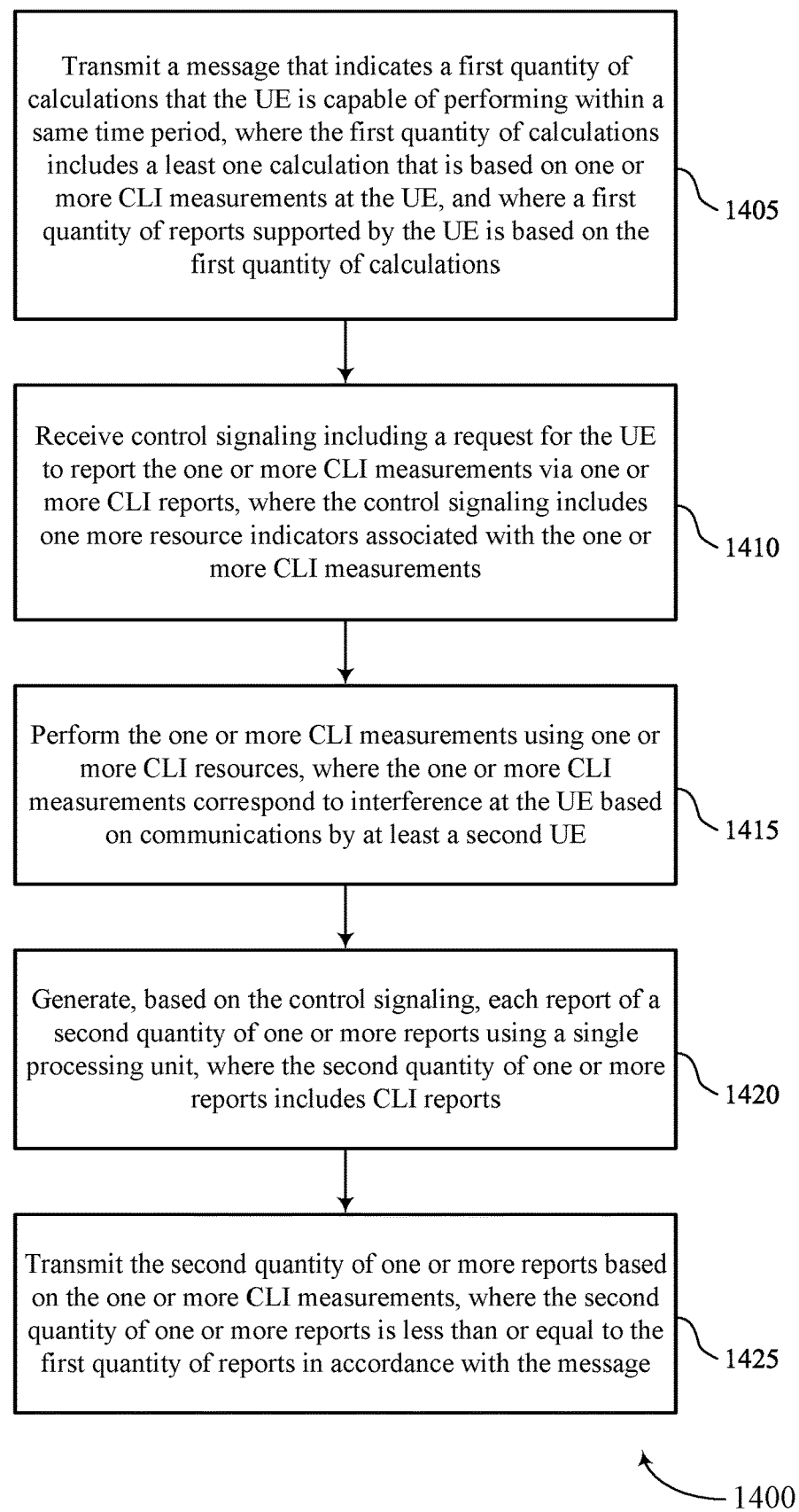

FIG. 14 shows a flowchart illustrating a method 1400 that supports CLI reporting for wireless communications in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting a message that indicates a first quantity of calculations that the UE is capable of performing within a same time period, where the first quantity of calculations includes at least one calculation that is based on one or more CLI measurements at the UE, and where a first quantity of reports supported by the UE is based on the first quantity of calculations. The operations of block 1405 may be performed in accordance with examples as disclosed herein. In some examples, aspects of the operations of 1405 may be performed by a calculation component 725 as described with reference to FIG. 7.

At 1410, the method may include receiving control signaling including a request for the UE to report the one or more CLI measurements via one or more CLI reports, where the control signaling includes one more resource indicators associated with the one or more CLI measurements. The operations of block 1410 may be performed in accordance with examples as disclosed herein. In some examples, aspects of the operations of 1410 may be performed by a control signaling component 740 as described with reference to FIG. 7.

At 1415, the method may include performing the one or more CLI measurements using one or more CLI resources, where the one or more CLI measurements correspond to interference at the UE based on communications by at least a second UE. The operations of block 1415 may be performed in accordance with examples as disclosed herein. In some examples, aspects of the operations of 1415 may be performed by a CLI measurement component 730 as described with reference to FIG. 7.

At 1420, the method may include generating, based on the control signaling, each report of the second quantity of one or more reports using a single processing unit, where the second quantity of one or more reports includes CLI reports. The operations of block 1420 may be performed in accordance with examples as disclosed herein. In some examples, aspects of the operations of 1420 may be performed by a report generation component 745 as described with reference to FIG. 7.

At 1425, the method may include transmitting the second quantity of one or more reports based on the one or more CLI measurements, where the second quantity of one or more reports is less than or equal to the first quantity of reports in accordance with the message. The operations of block 1425 may be performed in accordance with examples as disclosed herein. In some examples, aspects of the operations of 1425 may be performed by a report component 735 as described with reference to FIG. 7.

Figure 15:
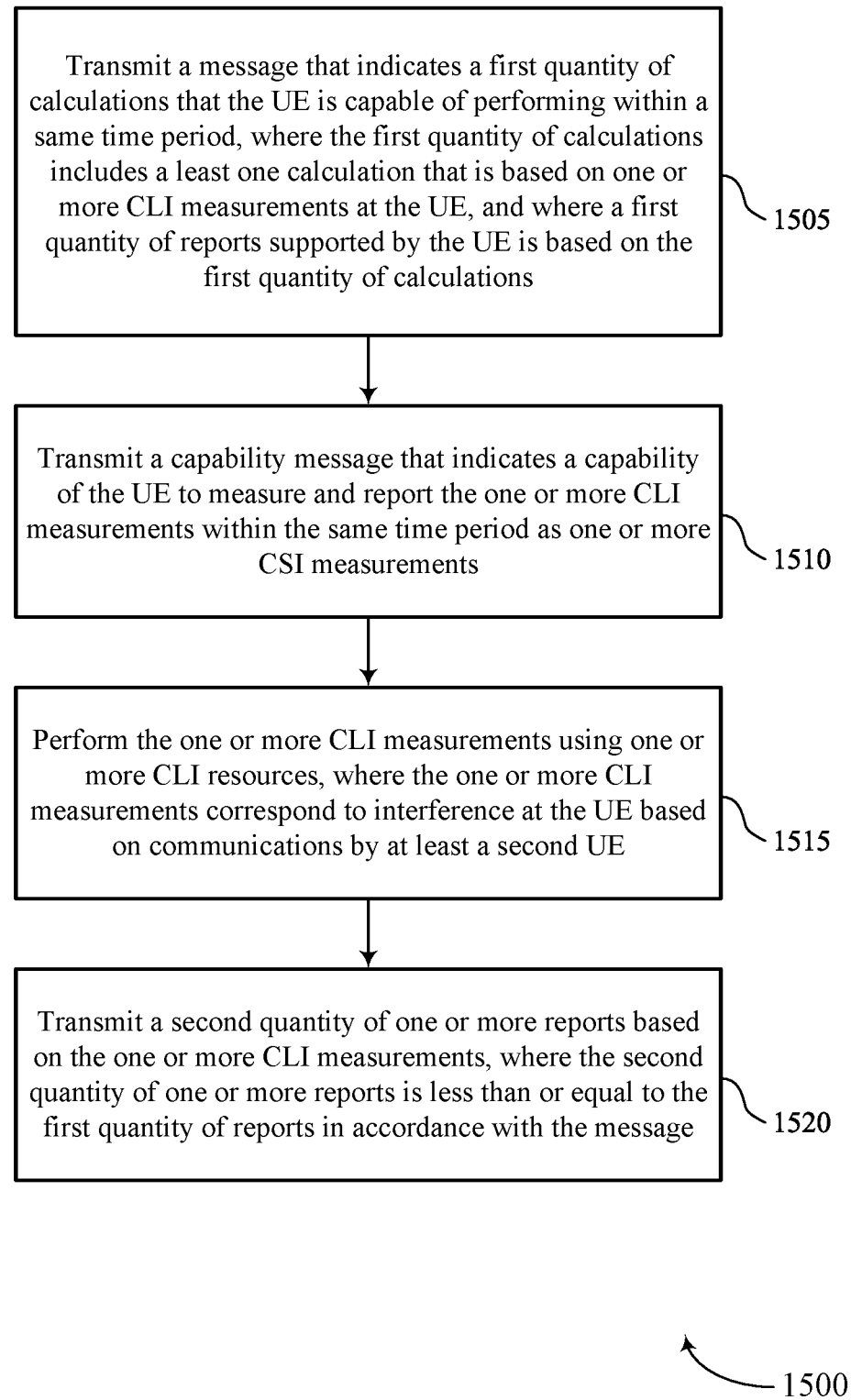

FIG. 15 shows a flowchart illustrating a method 1500 that supports CLI reporting for wireless communications in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include transmitting a message that indicates a first quantity of calculations that the UE is capable of performing within a same time period, where the first quantity of calculations includes at least one calculation that is based on one or more CLI measurements at the UE, and where a first quantity of reports supported by the UE is based on the first quantity of calculations. The operations of block 1505 may be performed in accordance with examples as disclosed herein. In some examples, aspects of the operations of 1505 may be performed by a calculation component 725 as described with reference to FIG. 7.

At 1510, the method may include transmitting a capability message that indicates a capability of the UE to measure and report the one or more CLI measurements within the same time period as one or more CSI measurements. The operations of block 1510 may be performed in accordance with examples as disclosed herein. In some examples, aspects of the operations of 1510 may be performed by a capability component 750 as described with reference to FIG. 7.

At 1515, the method may include performing the one or more CLI measurements using one or more CLI resources, where the one or more CLI measurements correspond to interference at the UE based on communications by at least a second UE. The operations of block 1515 may be performed in accordance with examples as disclosed herein. In some examples, aspects of the operations of 1515 may be performed by a CLI measurement component 730 as described with reference to FIG. 7.

At 1520, the method may include transmitting a second quantity of one or more reports based on the one or more CLI measurements, where the second quantity of one or more reports is less than or equal to the first quantity of reports in accordance with the message. The operations of block 1520 may be performed in accordance with examples as disclosed herein. In some examples, aspects of the operations of 1520 may be performed by a report component 735 as described with reference to FIG. 7.

Figure 16:
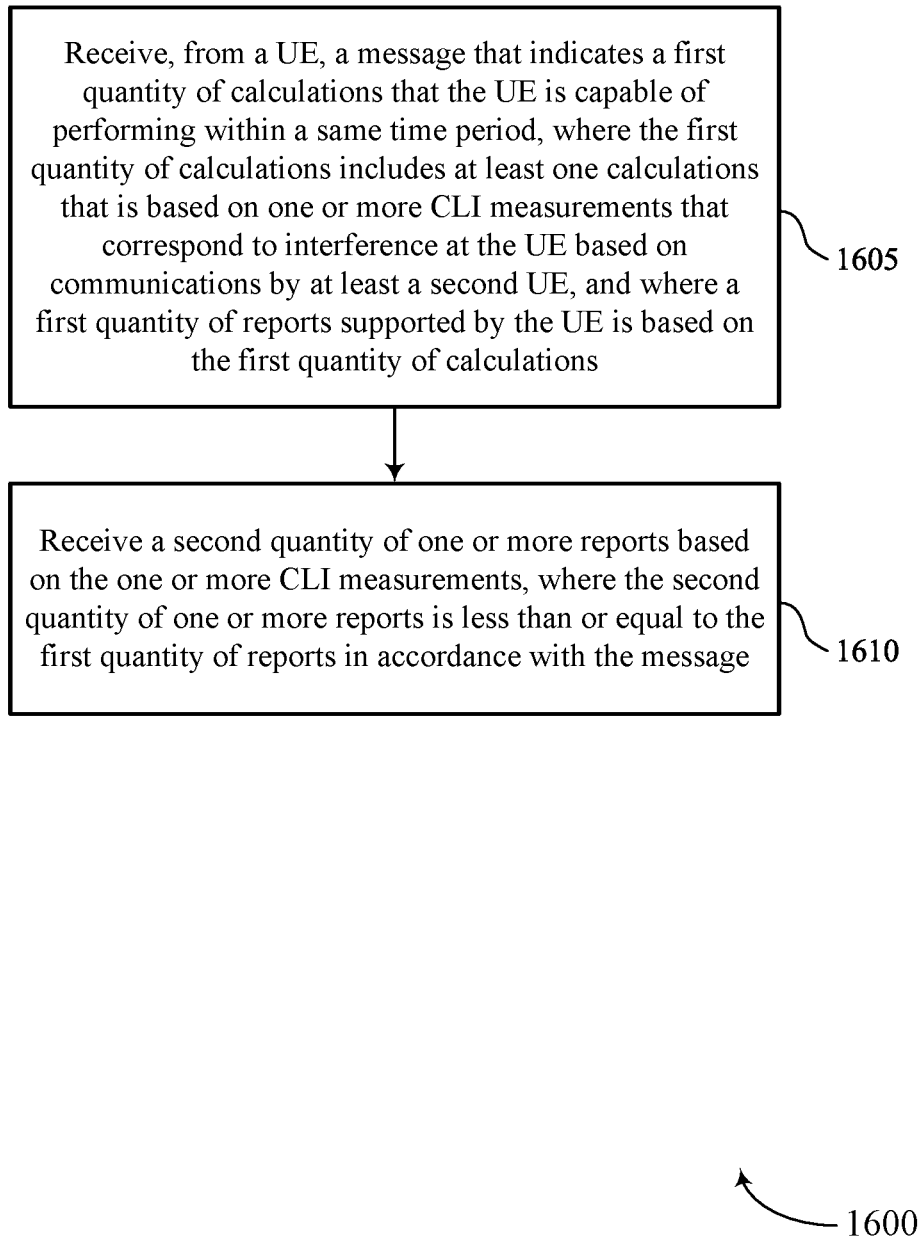

FIG. 16 shows a flowchart illustrating a method 1600 that supports CLI reporting for wireless communications in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include receiving, from a UE, a message that indicates a first quantity of calculations that the UE is capable of performing within a same time period, where the first quantity of calculations includes at least one calculations that is based on one or more CLI measurements that correspond to interference at the UE based on communications by at least a second UE, and where a first quantity of reports supported by the UE is based on the first quantity of calculations. The operations of block 1605 may be performed in accordance with examples as disclosed herein. In some examples, aspects of the operations of 1605 may be performed by a calculation component 1125 as described with reference to FIG. 11.

At 1610, the method may include receiving a second quantity of one or more reports based on the one or more CLI measurements, where the second quantity of one or more reports is less than or equal to the first quantity of reports in accordance with the message. The operations of block 1610 may be performed in accordance with examples as disclosed herein. In some examples, aspects of the operations of 1610 may be performed by a report component 1130 as described with reference to FIG. 11.

Figure 17:
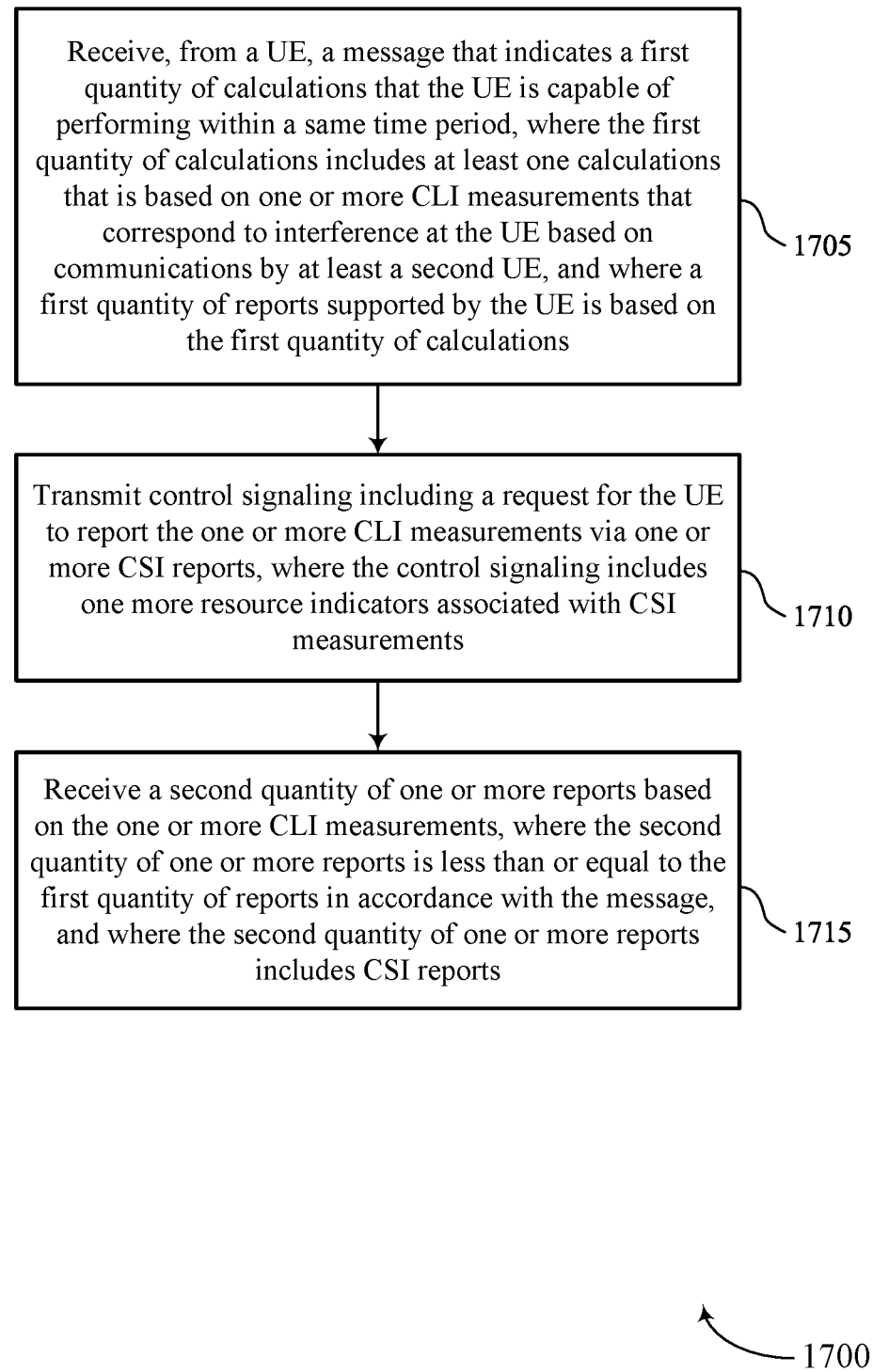

FIG. 17 shows a flowchart illustrating a method 1700 that supports CLI reporting for wireless communications in accordance with aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include receiving, from a UE, a message that indicates a first quantity of calculations that the UE is capable of performing within a same time period, where the first quantity of calculations includes at least one calculations that is based on one or more CLI measurements that correspond to interference at the UE based on communications by at least a second UE, and where a first quantity of reports supported by the UE is based on the first quantity of calculations. The operations of block 1705 may be performed in accordance with examples as disclosed herein. In some examples, aspects of the operations of 1705 may be performed by a calculation component 1125 as described with reference to FIG. 11.

At 1710, the method may include transmitting control signaling including a request for the UE to report the one or more CLI measurements via one or more CSI reports, where the control signaling includes one more resource indicators associated with CSI measurements. The operations of block 1710 may be performed in accordance with examples as disclosed herein. In some examples, aspects of the operations of 1710 may be performed by a control signaling component 1135 as described with reference to FIG. 11.

At 1715, the method may include receiving a second quantity of one or more reports based on the one or more CLI measurements, where the second quantity of one or more reports is less than or equal to the first quantity of reports in accordance with the message, and where the second quantity of one or more reports includes CSI reports. The operations of block 1715 may be performed in accordance with examples as disclosed herein. In some examples, aspects of the operations of 1715 may be performed by a report component 1130 as described with reference to FIG. 11.

The following provides an overview of aspects of the present disclosure:

Aspect 1: A method for wireless communication by a UE, comprising: transmitting a message that indicates a first quantity of calculations that the UE is capable of performing within a same time period, wherein the first quantity of calculations comprises a least one calculation that is based at least in part on one or more CLI measurements at the UE, and wherein a first quantity of reports supported by the UE is based at least in part on the first quantity of calculations; performing the one or more CLI measurements using one or more CLI resources, wherein the one or more CLI measurements correspond to interference at the UE based at least in part on communications by at least a second UE; and transmitting a second quantity of one or more reports based at least in part on the one or more CLI measurements, wherein the second quantity of one or more reports is less than or equal to the first quantity of reports in accordance with the message.

Aspect 2: The method of aspect 1, wherein transmitting the message comprises: transmitting, via the message, a parameter that indicates the first quantity of calculations that the UE is capable of performing within the same time period, wherein the first quantity of reports that is based at least in part on the first quantity of calculations comprises CSI reports that are based at least in part on the one or more CLI measurements and are further based at least in part one or more other channel quality measurements.

Aspect 3: The method of aspect 1, wherein transmitting the message comprises: transmitting, via the message, a parameter that indicates the first quantity of calculations that the UE is capable of performing within the same time period, wherein the first quantity of reports that is based at least in part on the first quantity of calculations comprises one or more CSI reports, one or more CLI reports, or any combination thereof that indicate the one or more CLI measurements.

Aspect 4: The method of aspect 1 wherein transmitting the message comprises: transmitting, via the message, a parameter that indicates the first quantity of calculations that the UE is capable of performing within the same time period, wherein the first quantity of reports that is based at least in part on the first quantity of calculations comprises one or more CLI reports that indicate the one or more CLI measurements.

Aspect 5: The method of aspect 4, further comprising: transmitting, via the message or a second message, a second parameter that indicates a second quantity of calculations that the UE is capable of performing within the same time period or a different time period, the second quantity of calculations based at least in part on one or more CSI measurements and associated with one or more CSI reports different than the one or more CLI reports.

Aspect 6: The method of any of aspects 1 through 5, further comprising: receiving control signaling comprising a request for the UE to report the one or more CLI measurements via one or more CLI reports, wherein the control signaling comprises one more resource indicators associated with the one or more CLI measurements; and generating, based at least in part on the control signaling, each report of the second quantity of one or more reports using a single processing unit, wherein the second quantity of one or more reports comprises CLI reports.

Aspect 7: The method of any of aspects 1 through 5, further comprising: receiving control signaling comprising a request for the UE to report the one or more CLI measurements via one or more CLI reports, wherein the control signaling comprises one more resource indicators associated with the one or more CLI measurements; and generating, based at least in part on the control signaling, each report of the second quantity of one or more reports using a quantity of processing units, wherein the second quantity of one or more reports comprises CLI reports, and wherein the quantity of processing resources is based at least in part on a quantity of CLI resources.

Aspect 8: The method of any of aspects 1 through 5, further comprising: receiving control signaling comprising a request for the UE to report the one or more CLI measurements via one or more CSI reports, wherein the control signaling comprises one or more resource indicators associated with CSI measurements; and generating, based at least in part on the control signaling, each report of the second quantity of one or more reports using a quantity of processing units, wherein the quantity of processing units is based at least in part on a quantity of CSI resources allocated for channel measurement.

Aspect 9: The method of aspect 8, wherein the quantity of processing resources is further based at least in part on a quantity of one or more CLI resources.

Aspect 10: The method of any of aspects 1 through 5, further comprising: receiving control signaling comprising a request for the UE to report the one or more CLI measurements and one or more CSI measurements jointly via the second quantity of one or more reports, wherein the control signaling comprises one or more resource indicators associated with the one or more CSI measurements and the one or more CLI measurements; and generating, based at least in part on the control signaling, each report of the second quantity of one or more reports using a quantity of processing units, wherein the quantity of processing units is based at least in part on a quantity of CSI resources allocated for channel measurement, wherein the second quantity of one or more reports comprises one or more CSI reports that are based at least in part on the one or more CLI measurements and are further based at least in part one or more other channel quality measurements.

Aspect 11: The method of aspect 10, wherein the quantity of processing units is further based at least in part on a quantity of one or more CLI resources.

Aspect 12: The method of any of aspects 1 through 11, further comprising: transmitting a capability message that indicates a capability of the UE to measure and report the one or more CLI measurements within the same time period as one or more CSI measurements.

Aspect 13: The method of aspect 12, wherein the second quantity of one or more reports comprises CSI reports that indicate the one or more CLI measurements based at least in part on the capability of the UE.

Aspect 14: The method of any of aspects 1 through 13, wherein the first quantity of reports comprises reports associated with a single component carrier or reports associated with a plurality of component carriers.

Aspect 15: The method of any of aspects 1 through 14, wherein the first quantity of calculations is equal to the first quantity of reports.

Aspect 16: The method of any of aspects 1 through 15, wherein the one or more CLI resources comprise CLI resources for RSRP, for RSSI measurements, or both.

Aspect 17: The method of any of aspects 1 through 16, wherein the first quantity of calculations is based at least in part on a quantity of processing units at the UE.

Aspect 18: A method for wireless communication by a network entity, comprising: receiving, from a UE, a message that indicates a first quantity of calculations that the UE is capable of performing within a same time period, wherein the first quantity of calculations comprises at least one calculations that is based at least in part on one or more CLI measurements that correspond to interference at the UE based at least in part on communications by at least a second UE, and wherein a first quantity of reports supported by the UE is based at least in part on the first quantity of calculations; and receiving a second quantity of one or more reports based at least in part on the one or more CLI measurements, wherein the second quantity of one or more reports is less than or equal to the first quantity of reports in accordance with the message.

Aspect 19: The method of aspect 18, wherein receiving the message comprises: receiving, via the message, a parameter that indicates the first quantity of calculations that the UE is capable of performing within the same time period, wherein the first quantity of reports that is based at least in part on the first quantity of calculations comprises CSI reports that are based at least in part on the one or more CLI measurements and are further based at least in part one or more other channel quality measurements.

Aspect 20: The method of aspect 18, wherein receiving the message comprises: receiving, via the message, a parameter that indicates the first quantity of calculations that the UE is capable of performing within the same time period, wherein the first quantity of reports that is based at least in part on the first quantity of calculations comprises one or more CSI reports, one or more CLI reports, or any combination thereof that indicate the one or more CLI measurements.

Aspect 21: The method of aspect 18, wherein receiving the message comprises: receiving, via the message, a parameter that indicates the first quantity of calculations that the UE is capable of performing within the same time period, wherein the first quantity of reports that is based at least in part on the first quantity of calculations comprises one or more CLI reports that indicate the one or more CLI measurements.

Aspect 22: The method of aspect 21, further comprising: receiving, via the message or a second message, a second parameter that indicates a second quantity of calculations that the UE is capable of performing within the same time period or a different time period, the second quantity of calculations based at least in part on one or more CSI measurements and associated with one or more CSI reports different than the one or more CLI reports.

Aspect 23: The method of any of aspects 18 through 22, further comprising: transmitting control signaling comprising a request for the UE to report the one or more CLI measurements via one or more CLI reports, wherein the control signaling comprises one more resource indicators associated with the one or more CLI measurements, and wherein the second quantity of one or more reports comprises CLI reports.

Aspect 24: The method of any of aspects 18 through 22, further comprising: transmitting control signaling comprising a request for the UE to report the one or more CLI measurements via one or more CSI reports, wherein the control signaling comprises one more resource indicators associated with CSI measurements, and wherein the second quantity of one or more reports comprises CSI reports.

Aspect 25: The method of any of aspects 18 through 22, further comprising: transmitting control signaling comprising a request for the UE to report the one or more CLI measurements and one or more CSI measurements jointly via the second quantity of one or more reports, wherein the control signaling comprises one more resource indicators associated with the one or more CSI measurements and the one or more CLI measurements, and wherein the second quantity of one or more reports comprises one or more CSI reports that are based at least in part on the one or more CLI measurements and are further based at least in part on one or more other channel quality measurements.

Aspect 26: The method of any of aspects 18 through 25, further comprising: receiving a capability message that indicates a capability of the UE to measure and report the one or more CLI measurements within the same time period as one or more CSI measurements.

Aspect 27: The method of aspect 26, wherein the second quantity of one or more reports comprises CSI reports that indicate the one or more CLI measurements based at least in part on the capability of the UE.

Aspect 28: The method of any of aspects 18 through 27, wherein the first quantity of reports comprises reports associated with a single component carrier or reports associated with a plurality of component carriers.

Aspect 29: The method of any of aspects 18 through 28, wherein the first quantity of calculations is equal to the first quantity of reports.

Aspect 30: A UE for wireless communication, comprising one or more processors; one or more memories coupled with the one or more processors; and instructions stored in the one or more memories and executable by the one or more processors to cause the UE to perform a method of any of aspects 1 through 17.

Aspect 31: A UE for wireless communication, comprising at least one means for performing a method of any of aspects 1 through 17.

Aspect 32: A non-transitory computer-readable medium storing code for wireless communication at a UE, the code comprising instructions executable by one or more processors to perform a method of any of aspects 1 through 17.

Aspect 33: A network entity for wireless communication, comprising one or more processors; one or more memories coupled with the one or more processors; and instructions stored in the one or more memories and executable by the one or more processors to cause the network entity to perform a method of any of aspects 18 through 29.

Aspect 34: A network entity for wireless communication, comprising at least one means for performing a method of any of aspects 18 through 29.

Aspect 35: A non-transitory computer-readable medium storing code for wireless communication at a network entity, the code comprising instructions executable by one or more processors to perform a method of any of aspects 18 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the phrase "a set" shall be construed as including the possibility of a set with one member. That is, the phrase "a set" shall be construed in the same manner as "one or more."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
one or more processors;
one or more memories coupled with the one or more processors; and
instructions stored in the one or more memories and executable by the one or more processors to cause the UE to:
transmit a message that indicates a first quantity of calculations that the UE is capable of performing within a same time period, wherein the first quantity of calculations comprises at least one calculation that is based at least in part on one or more cross-link interference measurements at the UE, and wherein a first quantity of reports supported by the UE is based at least in part on the first quantity of calculations;
perform the one or more cross-link interference measurements using one or more cross-link interference resources, wherein the one or more cross-link interference measurements correspond to interference at the UE based at least in part on communications by at least a second UE; and
transmit a second quantity of one or more reports based at least in part on the one or more cross-link interference measurements, wherein the second quantity of one or more reports is less than or equal to the first quantity of reports in accordance with the message.

2. The UE of claim 1, wherein the instructions to transmit the message are executable by the one or more processors to cause the UE to:
transmit, via the message, a parameter that indicates the first quantity of calculations that the UE is capable of performing within the same time period, wherein the first quantity of reports that is based at least in part on the first quantity of calculations comprises channel state information reports that are based at least in part on the one or more cross-link interference measurements and are further based at least in part one or more other channel quality measurements.

3. The UE of claim 1, wherein the instructions to transmit the message are executable by the one or more processors to cause the UE to:
transmit, via the message, a parameter that indicates the first quantity of calculations that the UE is capable of performing within the same time period, wherein the first quantity of reports that is based at least in part on the first quantity of calculations comprises one or more channel state information reports, one or more cross-link interference reports, or any combination thereof that indicate the one or more cross-link interference measurements.

4. The UE of claim 1, wherein the instructions to transmit the message are executable by the one or more processors to cause the UE to:
transmit, via the message, a parameter that indicates the first quantity of calculations that the UE is capable of performing within the same time period, wherein the first quantity of reports that is based at least in part on the first quantity of calculations comprises one or more cross-link interference reports that indicate the one or more cross-link interference measurements.

5. The UE of claim 4, wherein the instructions are further executable by the one or more processors to cause the UE to:
transmit, via the message or a second message, a second parameter that indicates a second quantity of calculations that the UE is capable of performing within the same time period or a different time period, the second quantity of calculations based at least in part on one or more channel state information measurements and associated with one or more channel state information reports different than the one or more cross-link interference reports.

6. The UE of claim 1, wherein the instructions are further executable by the one or more processors to cause the UE to:
receive control signaling comprising a request for the UE to report the one or more cross-link interference measurements via one or more cross-link interference reports, wherein the control signaling comprises one more resource indicators associated with the one or more cross-link interference measurements; and
generate, based at least in part on the control signaling, each report of the second quantity of one or more reports using a single processing unit, wherein the second quantity of one or more reports comprises cross-link interference reports.

7. The UE of claim 1, wherein the instructions are further executable by the one or more processors to cause the UE to:
receive control signaling comprising a request for the UE to report the one or more cross-link interference measurements via one or more cross-link interference reports, wherein the control signaling comprises one more resource indicators associated with the one or more cross-link interference measurements; and
generate, based at least in part on the control signaling, each report of the second quantity of one or more reports using a quantity of processing units, wherein the second quantity of one or more reports comprises cross-link interference reports, and wherein the quantity of processing resources is based at least in part on a quantity of cross-link interference resources.

8. The UE of claim 1, wherein the instructions are further executable by the one or more processors to cause the UE to:
receive control signaling comprising a request for the UE to report the one or more cross-link interference measurements via one or more channel state information reports, wherein the control signaling comprises one or more resource indicators associated with channel state information measurements; and
generate, based at least in part on the control signaling, each report of the second quantity of one or more reports using a quantity of processing units, wherein the quantity of processing units is based at least in part on a quantity of channel state information resources allocated for channel measurement.

9. The UE of claim 8, wherein the quantity of processing resources is further based at least in part on a quantity of one or more cross-link interference resources.

10. The UE of claim 1, wherein the instructions are further executable by the one or more processors to cause the UE to:
receive control signaling comprising a request for the UE to report the one or more cross-link interference measurements and one or more channel state information measurements jointly via the second quantity of one or more reports, wherein the control signaling comprises one or more resource indicators associated with the one or more channel state information measurements and the one or more cross-link interference measurements; and
generate, based at least in part on the control signaling, each report of the second quantity of one or more reports using a quantity of processing units, wherein the quantity of processing units is based at least in part on a quantity of channel state information resources allocated for channel measurement, wherein the second quantity of one or more reports comprises one or more channel state information reports that are based at least in part on the one or more cross-link interference measurements and are further based at least in part one or more other channel quality measurements.

11. The UE of claim 10, wherein the quantity of processing units is further based at least in part on a quantity of one or more cross-link interference resources.

12. The UE of claim 1, wherein the instructions are further executable by the one or more processors to cause the UE to:
transmit a capability message that indicates a capability of the UE to measure and report the one or more cross-link interference measurements within the same time period as one or more channel state information measurements.

13. The UE of claim 12, wherein the second quantity of one or more reports comprises channel state information reports that indicate the one or more cross-link interference measurements based at least in part on the capability of the UE.

14. The UE of claim 1, wherein the first quantity of reports comprises reports associated with a single component carrier or reports associated with a plurality of component carriers.

15. The UE of claim 1, wherein the first quantity of calculations is equal to the first quantity of reports.

16. The UE of claim 1, wherein the one or more cross-link interference resources comprise cross-link interference resources for reference signal received power, for received signal strength indication measurements, or both.

17. The UE of claim 1, wherein the first quantity of calculations is based at least in part on a quantity of processing units at the UE.

18. A network entity for wireless communication, comprising:
one or more processors;
one or more memories coupled with the one or more processors; and
instructions stored in the one or more memories and executable by the one or more processors to cause the network entity to:
receive, from a user equipment (UE), a message that indicates a first quantity of calculations that the UE is capable of performing within a same time period, wherein the first quantity of calculations comprises at least one calculations that is based at least in part on one or more cross-link interference measurements that correspond to interference at the UE based at least in part on communications by at least a second UE, and wherein a first quantity of reports supported by the UE is based at least in part on the first quantity of calculations; and
receive a second quantity of one or more reports based at least in part on the one or more cross-link interference measurements, wherein the second quantity of one or more reports is less than or equal to the first quantity of reports in accordance with the message.

19. The network entity of claim 18, wherein the instructions to receive the message are executable by the one or more processors to cause the network entity to:
receive, via the message, a parameter that indicates the first quantity of calculations that the UE is capable of performing within the same time period, wherein the first quantity of reports that is based at least in part on the first quantity of calculations comprises channel state information reports that are based at least in part on the one or more cross-link interference measurements and are further based at least in part one or more other channel quality measurements.

20. The network entity of claim 18, wherein the instructions to receive the message are executable by the one or more processors to cause the network entity to:
receive, via the message, a parameter that indicates the first quantity of calculations that the UE is capable of performing within the same time period, wherein the first quantity of reports that is based at least in part on the first quantity of calculations comprises one or more channel state information reports, one or more cross-link interference reports, or any combination thereof that indicate the one or more cross-link interference measurements.

21. The network entity of claim 18, wherein the instructions to receive the message are executable by the one or more processors to cause the network entity to:
receive, via the message, a parameter that indicates the first quantity of calculations that the UE is capable of performing within the same time period, wherein the first quantity of reports that is based at least in part on the first quantity of calculations comprises one or more cross-link interference reports that indicate the one or more cross-link interference measurements.

22. The network entity of claim 21, wherein the instructions are further executable by the one or more processors to cause the network entity to:
receive, via the message or a second message, a second parameter that indicates a second quantity of calculations that the UE is capable of performing within the same time period or a different time period, the second quantity of calculations based at least in part on one or more channel state information measurements and associated with one or more channel state information reports different than the one or more cross-link interference reports.

23. The network entity of claim 18, wherein the instructions are further executable by the one or more processors to cause the network entity to:
transmit control signaling comprising a request for the UE to report the one or more cross-link interference measurements via one or more cross-link interference reports, wherein the control signaling comprises one more resource indicators associated with the one or more cross-link interference measurements, and wherein the second quantity of one or more reports comprises cross-link interference reports.

24. The network entity of claim 18, wherein the instructions are further executable by the one or more processors to cause the network entity to:
transmit control signaling comprising a request for the UE to report the one or more cross-link interference measurements via one or more channel state information reports, wherein the control signaling comprises one more resource indicators associated with channel state information measurements, and wherein the second quantity of one or more reports comprises channel state information reports.

25. The network entity of claim 18, wherein the instructions are further executable by the one or more processors to cause the network entity to:
transmit control signaling comprising a request for the UE to report the one or more cross-link interference measurements and one or more channel state information measurements jointly via the second quantity of one or more reports, wherein the control signaling comprises one more resource indicators associated with the one or more channel state information measurements and the one or more cross-link interference measurements, and wherein the second quantity of one or more reports comprises one or more channel state information reports that are based at least in part on the one or more cross-link interference measurements and are further based at least in part on one or more other channel quality measurements.

26. The network entity of claim 18, wherein the instructions are further executable by the one or more processors to cause the network entity to:
receive a capability message that indicates a capability of the UE to measure and report the one or more cross-link interference measurements within the same time period as one or more channel state information measurements.

27. The network entity of claim 26, wherein the second quantity of one or more reports comprises channel state information reports that indicate the one or more cross-link interference measurements based at least in part on the capability of the UE.

28. The network entity of claim 18, wherein the first quantity of reports comprises reports associated with a single component carrier or reports associated with a plurality of component carriers.

29. A method for wireless communication by a user equipment (UE), comprising:
transmitting a message that indicates a first quantity of calculations that the UE is capable of performing within a same time period, wherein the first quantity of calculations comprises at least one calculation that is based at least in part on one or more cross-link interference measurements at the UE, and wherein a first quantity of reports supported by the UE is based at least in part on the first quantity of calculations;
performing the one or more cross-link interference measurements using one or more cross-link interference resources, wherein the one or more cross-link interference measurements correspond to interference at the UE based at least in part on communications by at least a second UE; and
transmitting a second quantity of one or more reports based at least in part on the one or more cross-link interference measurements, wherein the second quantity of one or more reports is less than or equal to the first quantity of reports in accordance with the message.

30. A method for wireless communication by a network entity, comprising:
receiving, from a user equipment (UE), a message that indicates a first quantity of calculations that the UE is capable of performing within a same time period, wherein the first quantity of calculations comprises at least one calculations that is based at least in part on one or more cross-link interference measurements that correspond to interference at the UE based at least in part on communications by at least a second UE, and wherein a first quantity of reports supported by the UE is based at least in part on the first quantity of calculations; and
receiving a second quantity of one or more reports based at least in part on the one or more cross-link interference measurements, wherein the second quantity of one or more reports is less than or equal to the first quantity of reports in accordance with the message.

* * * * *